United States Patent
Zimmerman et al.

(10) Patent No.: US 11,121,423 B2
(45) Date of Patent: *Sep. 14, 2021

(54) ALKALINE METAL-AIR BATTERY CATHODE

(71) Applicant: Ionic Materials, Inc., Woburn, MA (US)

(72) Inventors: Michael A. Zimmerman, No. Andover, MA (US); Alexei B. Gavrilov, Woburn, MA (US); G. Stephen Kelsey, Nashua, NH (US); Keith Smith, Methuen, MA (US)

(73) Assignee: Ionic Materials, Inc., Woburn, MA (US)

(*) Notice: Subject to any disclaimer, the term of this patent is extended or adjusted under 35 U.S.C. 154(b) by 93 days.

This patent is subject to a terminal disclaimer.

(21) Appl. No.: 16/174,648

(22) Filed: Oct. 30, 2018

(65) Prior Publication Data

US 2019/0067764 A1 Feb. 28, 2019

Related U.S. Application Data

(63) Continuation of application No. 15/169,160, filed on May 31, 2016, now Pat. No. 10,199,657, and a continuation-in-part of application No. 15/148,085, filed on May 6, 2016, which is a continuation-in-part of application No. 14/559,430, filed on Dec. 3, 2014, now Pat. No. 9,742,008, which is a
(Continued)

(51) Int. Cl.
*H01M 12/06* (2006.01)
*H01M 4/505* (2010.01)
*H01M 4/50* (2010.01)
*H01M 4/62* (2006.01)

(52) U.S. Cl.
CPC ............ *H01M 12/06* (2013.01); *H01M 4/50* (2013.01); *H01M 4/505* (2013.01); *H01M 4/62* (2013.01); *H01M 4/624* (2013.01)

(58) Field of Classification Search
CPC ................. H01M 12/06; H01M 6/181; H01M 2300/0082
See application file for complete search history.

(56) References Cited

U.S. PATENT DOCUMENTS

| | | |
|---|---|---|
| 2,638,489 A | 5/1953 | Ruben |
| 3,257,241 A | 6/1966 | Tamminen |
| 3,336,279 A | 8/1967 | Scott |

(Continued)

FOREIGN PATENT DOCUMENTS

| | | |
|---|---|---|
| CN | 1285086 A | 2/2001 |
| CN | 1326596 C | 12/2001 |

(Continued)

OTHER PUBLICATIONS

Croce et al. Nanocomposite polymer electrolytes for lithium batteries. Nature, 394, 456-458. Jul. 30, 1998. (Year: 1998).*

(Continued)

*Primary Examiner* — Stephen E Rieth
(74) *Attorney, Agent, or Firm* — Burns & Levinson LLP; Joseph M. Maraia

(57) ABSTRACT

A metal-air battery and a component air cathode including a solid ionically conductive polymer material.

19 Claims, 7 Drawing Sheets

Related U.S. Application Data continuation-in-part of application No. 13/861,170, filed on Apr. 11, 2013, now Pat. No. 9,819,053.

(60) Provisional application No. 62/169,812, filed on Jun. 2, 2015, provisional application No. 62/158,841, filed on May 8, 2015, provisional application No. 61/911,049, filed on Dec. 3, 2013, provisional application No. 61/662,705, filed on Apr. 11, 2012.

(56) References Cited

U.S. PATENT DOCUMENTS

| | | |
|---|---|---|
| 3,502,606 A | 3/1970 | Conciatore et al. |
| 4,243,732 A | 1/1981 | Powers et al. |
| 4,465,744 A | 8/1984 | Susman et al. |
| 4,720,910 A | 1/1988 | Rourke et al. |
| 4,804,594 A | 2/1989 | Jow et al. |
| 4,925,751 A | 5/1990 | Shackle et al. |
| 5,147,739 A | 9/1992 | Beard |
| 5,160,880 A | 11/1992 | Palanisamy |
| 5,227,043 A | 7/1993 | Shakushiro et al. |
| 5,270,137 A | 12/1993 | Kubota |
| 5,378,560 A * | 1/1995 | Tomiyama ............ H01M 4/485 429/217 |
| 5,403,675 A | 4/1995 | Ogata et al. |
| 5,424,151 A | 6/1995 | Koksbang et al. |
| 5,462,566 A | 10/1995 | Skotheim |
| 5,506,073 A | 4/1996 | Angell et al. |
| 5,582,937 A | 12/1996 | LaFollette |
| 5,599,355 A | 2/1997 | Nagasubramanian et al. |
| 5,620,811 A | 4/1997 | Zhang et al. |
| 5,648,187 A | 7/1997 | Skotheim |
| 5,688,613 A | 11/1997 | Li et al. |
| 5,713,169 A | 2/1998 | Meier et al. |
| 5,888,672 A | 3/1999 | Gustafson et al. |
| 5,917,693 A | 6/1999 | Kono et al. |
| 5,989,742 A | 11/1999 | Cabasso et al. |
| 6,074,773 A | 6/2000 | Wilkinson et al. |
| 6,110,619 A | 8/2000 | Zhang et al. |
| 6,183,914 B1 | 2/2001 | Yao et al. |
| 6,248,474 B1 | 6/2001 | Nishiyama et al. |
| 6,274,261 B1 | 8/2001 | Tinker et al. |
| 6,274,681 B1 | 8/2001 | Inagaki et al. |
| 6,358,651 B1 | 3/2002 | Chen et al. |
| 6,376,123 B1 | 4/2002 | Chu |
| 6,413,676 B1 | 7/2002 | Munshi |
| 6,451,487 B1 | 9/2002 | Besner et al. |
| 6,455,202 B1 * | 9/2002 | Marugan ............ H01M 4/622 429/245 |
| 6,461,724 B1 | 10/2002 | Radovanovic et al. |
| 6,630,271 B1 | 10/2003 | Arcella et al. |
| 6,645,675 B1 | 11/2003 | Munshi |
| 6,652,440 B1 | 11/2003 | Kovalev et al. |
| 6,727,343 B2 | 4/2004 | Morris et al. |
| 7,070,882 B1 | 7/2006 | Ferrando |
| 7,455,935 B2 | 11/2008 | Abe et al. |
| 7,651,647 B1 | 1/2010 | Strange et al. |
| 8,227,105 B1 | 7/2012 | Gerald, II et al. |
| 8,753,594 B1 | 6/2014 | Burba, III et al. |
| 8,877,376 B2 | 11/2014 | Wakizaka et al. |
| 8,906,556 B2 | 12/2014 | Hambitzer |
| 8,945,432 B2 | 2/2015 | Towns et al. |
| 9,742,008 B2 | 8/2017 | Zimmerman et al. |
| 9,819,053 B1 | 11/2017 | Zimmerman |
| 10,199,657 B2 * | 2/2019 | Zimmerman ............ H01M 4/24 |
| 10,553,901 B2 | 2/2020 | Zimmerman et al. |
| 2001/0003863 A1 | 6/2001 | Thibault et al. |
| 2002/0010261 A1 | 1/2002 | Callahan et al. |
| 2002/0048706 A1 | 4/2002 | Mayes et al. |
| 2002/0177043 A1 | 11/2002 | Ndzebet et al. |
| 2003/0013012 A1 | 1/2003 | Ahn et al. |
| 2003/0069343 A1 | 4/2003 | Smith et al. |
| 2003/0138702 A1 | 7/2003 | Gerald, II et al. |
| 2003/0162087 A1 | 8/2003 | Clarke et al. |
| 2003/0209692 A1 | 11/2003 | Farrand et al. |
| 2004/0023116 A1 | 2/2004 | Fujino et al. |
| 2004/0076881 A1 | 4/2004 | Bowden et al. |
| 2004/0157101 A1 | 8/2004 | Smedley |
| 2004/0229118 A1 | 11/2004 | Wensley et al. |
| 2004/0241553 A1 | 12/2004 | Abe et al. |
| 2005/0019661 A1 | 1/2005 | Han et al. |
| 2005/0112471 A1 | 5/2005 | Chen et al. |
| 2005/0164085 A1 | 7/2005 | Bofinger et al. |
| 2005/0181280 A1 | 8/2005 | Ceder et al. |
| 2005/0244696 A1 | 11/2005 | Kuromatsu et al. |
| 2005/0287441 A1 | 12/2005 | Passerini et al. |
| 2006/0004112 A1 | 1/2006 | Shimoyama et al. |
| 2006/0166085 A1 | 7/2006 | Hennige et al. |
| 2006/0269834 A1 | 11/2006 | West et al. |
| 2007/0015047 A1 | 1/2007 | Hosaka et al. |
| 2007/0020525 A1 | 1/2007 | Kim et al. |
| 2007/0051366 A1 | 3/2007 | Hansmann et al. |
| 2007/0166618 A1 | 7/2007 | Armand et al. |
| 2007/0250036 A1 | 10/2007 | Volk et al. |
| 2008/0066297 A1 | 3/2008 | Lin et al. |
| 2008/0090138 A1 | 4/2008 | Vu et al. |
| 2008/0118826 A1 | 5/2008 | Shimamura et al. |
| 2008/0199755 A1 | 8/2008 | Brotherston et al. |
| 2008/0248356 A1 | 10/2008 | Kimura et al. |
| 2008/0292953 A1 | 11/2008 | Hosaka et al. |
| 2008/0300380 A1 | 12/2008 | Bai et al. |
| 2009/0162755 A1 | 6/2009 | Neudecker |
| 2009/0197183 A1 | 8/2009 | Kato |
| 2009/0246636 A1 | 10/2009 | Chiang et al. |
| 2009/0272731 A1 | 11/2009 | Olding et al. |
| 2010/0227224 A1 | 9/2010 | Eitouni et al. |
| 2011/0020708 A1 | 1/2011 | Fujiki et al. |
| 2011/0027666 A1 | 2/2011 | Burchardt et al. |
| 2011/0070027 A1 | 3/2011 | Padhi et al. |
| 2011/0104511 A1 | 5/2011 | Okumura et al. |
| 2011/0104571 A1 | 5/2011 | Zhamu et al. |
| 2011/0111287 A1 | 5/2011 | Sayre et al. |
| 2011/0204341 A1 | 8/2011 | Brown et al. |
| 2011/0223477 A1 | 9/2011 | Nelson et al. |
| 2011/0223518 A1 | 9/2011 | Hirakimoto |
| 2011/0274983 A1 | 11/2011 | Yontz et al. |
| 2011/0274990 A1 | 11/2011 | Xu |
| 2011/0281158 A1 | 11/2011 | Tazoe |
| 2011/0281159 A1 | 11/2011 | Farmer et al. |
| 2011/0318646 A1 | 12/2011 | Babinec et al. |
| 2012/0094250 A1 | 4/2012 | Lloyd et al. |
| 2012/0107690 A1 | 5/2012 | Wakizaka et al. |
| 2012/0115049 A1 | 5/2012 | Rinzler et al. |
| 2012/0129045 A1 | 5/2012 | Gin et al. |
| 2012/0164526 A1 | 6/2012 | Adamson et al. |
| 2012/0171574 A1 | 7/2012 | Zhamu et al. |
| 2012/0189897 A1 | 7/2012 | Wakizaka et al. |
| 2012/0208091 A1 | 8/2012 | Tsai et al. |
| 2012/0231355 A1 | 9/2012 | Lee et al. |
| 2012/0321970 A1 | 12/2012 | Friesen et al. |
| 2013/0084507 A1 | 4/2013 | Johnson |
| 2013/0136981 A1 | 5/2013 | Peuchert et al. |
| 2013/0149436 A1 | 6/2013 | Hsieh et al. |
| 2013/0189589 A1 | 7/2013 | Hashaikeh et al. |
| 2013/0216936 A1 | 8/2013 | Fuchs et al. |
| 2014/0004431 A1 | 1/2014 | Yamaguchi et al. |
| 2014/0057153 A1 | 2/2014 | Visco et al. |
| 2014/0059820 A1 | 3/2014 | Wright et al. |
| 2014/0079995 A1 * | 3/2014 | Wakada ............ H01M 4/366 429/211 |
| 2014/0088207 A1 | 3/2014 | Elabd et al. |
| 2014/0141336 A1 | 5/2014 | Morin |
| 2014/0227614 A1 | 8/2014 | Lee et al. |
| 2014/0377621 A1 | 12/2014 | Hanyu et al. |
| 2015/0064574 A1 | 3/2015 | He et al. |
| 2015/0064575 A1 | 3/2015 | He et al. |
| 2015/0146452 A1 | 5/2015 | Kim et al. |
| 2015/0155559 A1 | 6/2015 | Zimmerman et al. |
| 2015/0180037 A1 | 6/2015 | Gronwald et al. |
| 2015/0280218 A1 | 10/2015 | Zimmerman et al. |
| 2015/0364791 A1 * | 12/2015 | Vu ............ H01M 4/386 429/306 |
| 2016/0028133 A1 | 1/2016 | Miles |
| 2016/0118685 A1 | 4/2016 | Zhang et al. |

(56) References Cited

U.S. PATENT DOCUMENTS

| | | | |
|---|---|---|---|
| 2016/0233461 A1 | 8/2016 | Young et al. |
| 2016/0233510 A1 | 8/2016 | Onodera et al. |
| 2016/0365553 A1 | 12/2016 | Kountz et al. |
| 2017/0005356 A1 | 1/2017 | Zimmerman |
| 2017/0018781 A1 | 1/2017 | Zimmerman |
| 2017/0092958 A1 | 3/2017 | Zimmerman et al. |
| 2017/0338492 A1 | 11/2017 | Zimmerman et al. |
| 2018/0006308 A1 | 1/2018 | Zimmerman et al. |
| 2018/0151910 A1 | 5/2018 | Zimmerman et al. |
| 2018/0151914 A1 | 5/2018 | Zimmerman et al. |
| 2018/0175372 A1 | 6/2018 | Zimmerman et al. |
| 2018/0198124 A1 | 7/2018 | Zimmerman et al. |
| 2018/0212232 A1 | 7/2018 | Zimmerman et al. |
| 2018/0219210 A1 | 8/2018 | Kim |
| 2018/0241031 A1 | 8/2018 | Pan et al. |

FOREIGN PATENT DOCUMENTS

| | | |
|---|---|---|
| CN | 1354529 C | 6/2002 |
| CN | 1457518 C | 11/2003 |
| CN | 1592937 C | 3/2005 |
| CN | 1965436 A | 5/2007 |
| CN | 101290985 A | 10/2008 |
| JP | 59-157151 A | 9/1984 |
| JP | 04-267055 A | 9/1992 |
| JP | 9-219197 A | 8/1997 |
| JP | 2002/352799 A | 12/2002 |
| JP | 2002358959 A | 12/2002 |
| JP | 2003/242964 A | 8/2003 |
| JP | 2004-265675 A | 9/2004 |
| JP | 2005/535076 A | 11/2005 |
| JP | 2006/049122 A | 2/2006 |
| JP | 2006-210089 A | 8/2006 |
| JP | 2006-520519 A | 9/2006 |
| JP | 2010/509719 A | 3/2010 |
| JP | 2011-28976 A | 2/2011 |
| JP | 2012-517519 A | 8/2012 |
| JP | 2014-067638 A | 4/2014 |
| JP | 2014-112560 A | 6/2014 |
| KR | 10-2011-0106342 A | 9/2011 |
| KR | 10-2012-0117853 A | 10/2012 |
| KR | 10-2008-0023294 A | 3/2013 |
| WO | 1998/042037 A1 | 9/1998 |
| WO | 1999/33127 A1 | 7/1999 |
| WO | 2001/17051 A1 | 3/2001 |
| WO | 2001/026175 A1 | 4/2001 |
| WO | 2004/027909 A1 | 4/2004 |
| WO | 2006/019064 A2 | 2/2006 |
| WO | 2011/146670 A1 | 11/2011 |
| WO | 2014/020349 A1 | 2/2014 |
| WO | 2015/084940 A1 | 6/2015 |
| WO | 2015/153729 A1 | 10/2015 |
| WO | 2016/196873 A1 | 12/2016 |
| WO | 2016/197098 A1 | 12/2016 |
| WO | 2019/065066 A1 | 4/2019 |
| WO | 2019/126532 A1 | 6/2019 |
| WO | 2020/005700 A1 | 1/2020 |

OTHER PUBLICATIONS

Taib et al. Plastic crystal-solid biopolymerelectrolytes for rechargeable lithium batteries. Journal of Membrane Science, 2014, 468, 149-154. (Year: 2014).*

Diez-Pascual, A., et al. "High-Performance Aminated Poly(phenylene sulfide)/ZnO Nanocomposites for Medical Applications." ACS Applied Materials & Interfaces 6, No. 13 (Jun. 13, 2014), 10132-10145.

Wu, Y., ed., "Chapter 11: Solid Electrolyte." In Lithium Ion Battery Application and Practice, Chemical Industry Press, China: Chemical Industry Press, 2011. Cited in Third Office Action for CN 2015/80018411.6. Art is summarized in the attached foreign Office Action citing the art, and a translation of the summary with a copy of the translator signature is attached.

Fedelich, N., Application Handbook Thermal Analysis of Polymers Selected Applications Thermal Analysis, Jan. 1, 2013. Retrieved from the Internet: https://www.mt.com/dam/LabDiv/guides-glen/ta-polymer/TA_Polymers_Selected_Apps_EN.pdf.

Imrie, C.T. et al., "Ion Transport in Glassy Polymer Electrolytes," Journal of Physical Chemistry B, vol. 103, pp. 4132-4138, 1999.

Lu, Y. et al., Platinum-Gold Nanoparticles: A Highly Active Bifunctional Electrocatalyst for Rechargeable Lithium-Air Batteries, Journal of the American Chemical Society vol. 132, No. 35, pp. 12170-12171, 2010.

Taib, N. U. et al., "Plastic crystal-solid biopolymer electrolytes for rechargeable lithium batteries," Journal of Membrane Science, vol. 468, pp. 149-154, 2014.

European Supplemental Search Report, dated Oct. 15, 2019, for EP Application No. 16804233.1, filed on Dec. 21, 2017, European National Phase filing date based on PCT filed of May 31, 2016.

Singapore Office Action, dated Dec. 13, 2019 for SG Patent Application No. 10201811811Y, filed on Jun. 3, 2016.

Ahmad et al., Structural studies and ionic conductivity of lithium iodide-lithium tungstate solid electrolytes. Ionics, 2002, 8, 433-438 (2002).

Candlin, J. "Polymers" within "The Chemical Industry: Second Edition." Edited by Alan Heaton. 1994. Spring Science+Business Media Dordrecht, pp. 116-121.

Celazole® T-Series: Injection Molding Thermoplastic Polymers. Brochure of PBI Performance Products, Inc., 2013.

Definition of Dopant. http://www.merriam-webster.com/dictionary/dopant. Downloaded Feb. 4, 2019.

Definition of Nonflammable. http://www.dictionary.com/browse/nonflammable?s=t. As viewed on Jun. 7, 2016.

Ferrando, W.A., "Development of a Novel Composite Aluminum Anode," Journal of Power Sources, vol. 130, Issues 102, pp. 309-314, May 2004. Abstract only.

Gal'Perin et al., Determination of the crystallinity of polyvinylidene fluoride. Polymer Science: USSR 1970, 12, 2133-2139 (1970).

Lee et al., PVDF-based nanocomposite solid polymer electrolytes; the effect of affinity between PVDF and filler on ionic conductivity. Composite Interfaces 2009, 16, 347-358.

Lefrou, C. et al., "Electrochemistry: The Basics, With Examples." Springer-Verlag Berlin Heidelberg, pp. 22-25, 2012.

Lithium Iodide Information. ChemBook. http://www.chemicalbook.com/ChemicalProductProperty_EN_cb8688141.htm. As viewed on Apr. 25, 2017.

Miyatake, K. et al., "Synthesis of poly(phenylene sulfide sulfonic acid) via poly(sulfoniumcation) as a thermostable proton-conducting polymer," Macromolecules, vol. 29, pp. 6969-6971, 1996.

PBI Information. Polymers: A Property Database 2017, CRC Press, Taylor & Francis Group (2017).

Polyacrylonitrile Information. ChemicalBook. http://www.chemicalbook.com/ChemicalProductProperty_USCB9199592.aspx. As viewed on Jan. 18, 2018.

Polymer Density Table. ScientificPolymer. http://scientificpolymer.com/density-of-polymers-by-density/. As viewed on Mar. 11, 2015.

Polyvinylidenefluoride (PVDF) Information, Goodfellow, http://www.goodfellow.com/E/Polyvinylidenefluoride.html. As viewed on Jan. 18, 2018.

Polystyrene, Wikipedia. https://en.wikipedia.org/wiki/Polystyrene. Downloaded Feb. 4, 2019.

Sandor, R.B., "PBI (Polybenzimidazole): Synthesis, Properties and Applications," High Performance Polymers, vol. 2, No. 1, pp. 25-37, 1990.

Sannigrahi, A. et al., "Tuning the Molecular Properties of Polybenzimidazole by Copolymerization," Journal of Physical Chemistry B, vol. 111, pp. 12124-12132, 2007.

Spry, R.J. et al., Anisotropic Ionic Conductivity of Lithium-Doped Sulfonated PBI, Journal of Polymer Science: Part B: Polymer Physics, 35, 2925-2933 (1997).

Suib, S.L., New and future developments in catalysis: Batteries, Hydrogen Storage and Fuel Cells. Elsevier B.V. Jul. 29, 2013, pp. 1-16.

Teng, H., "Overview of the development of the fluoropolymer Industry," Applied Sciences, 2012, vol. 2, pp. 496-512.

(56) References Cited

OTHER PUBLICATIONS

Supplementary European Search Report, dated Apr. 5, 2017, from related European Patent Application No. 14868257, filed on Dec. 3, 2014.
Extended European Search Report, dated Oct. 9, 2018, from related European Application No. EP 16804233, filed on Jan. 2, 2018.
International Search Report and the Written Opinion of the International Search Authority, dated Apr. 5, 2017, from related PCT/US2014/068338, filed on Dec. 3, 2014.
International Search Report and the Written Opinion of the International Search Authority, dated Oct. 26, 2016, from related PCT/US2016/035040, filed on May 31, 2016.
Chiu, H.-T. et al., "Intermolecular Interactions and Aggregated Structures in Poly(p-phenylene sulfide) Doped with Some Organic Acceptors," Kobunshi Ronbunshu, vol. 41, No. 9, pp. 525-529, 1984. English abstract only, p. 529.
Brady, D.G. "The crystallinity of poly(phenylene sulfide) and its effect on polymer properties." Journal of Applied Polymer Science, 1976, 20, 2541-2551.
Diez-Pascual, A.M. et al., "Inorganic nanoparticle-modified poly(phenylene sulphide)/carbon fiber laminates: thermomechanical behaviour." Materials, 2013, vol. 6, 3171-3193.
Lefkowitz et al., "Influence of pH on the Reductive Transformation of Birnessite by Aqueous Mn(II)," Environmental Science & Technology, vol. 47, pp. 10364-10371, 2013.
Lu, Cuihong and Pan, Chunyue, "A Review on Factors Influencing Ionic Conductivity of Polymer Electrolyte," Materials Reports, pp. 58-60, 38, Apr. 17, 2003. Chinese with English translation.
Nohara, L.B. et al., "Study of crystallization behavior of poly(phenylene sulfide)." Polimeros: Ciencia e tecnologia, 2006, 16, 104-110.
Persson et al., "Materials Data on MnO2 (SG:164) by Materials Project," database entry #mp-25558, Nov. 2014 [retrieved via <https://doi.org/10.17188/1200755>].
Wang et al., "The effects of Mn loading on the structure and ozone decomposition activity of MnOx supported on activated carbon," Chinese Journal of Catalysis, vol. 35, No. 3, pp. 335-341, Mar. 13, 2014.
Yu et al., "Solution-combustion synthesis of epsilo-MnO2 for supercapacitors," Materials Letters, vol. 64, pp. 61-64, Oct. 9, 2009.
Zak, A.K. et al., "Synthesis and characterization of a narrow size distribution of zinc oxide nanoparticles." International Journal of Nanomedicine, 2011, vol. 6, No. 2, pp. 1399-1403.
International Search Report and Written Opinion, dated Oct. 2, 2019 for related PCT/US2019/038190, filed on Jun. 20, 2019.
Barron et al. The Effect of Temperature on Conductivity Measurement. TSP, vol. 3. 2007. [retrieved on Aug. 9, 2016]. Retrieved from the Internet: <URL:http://www.reagecon.com/pdf/technicalpapers/Effect_of_Temperature_TSP-07_Issue3.pdf>. entire document.
Dang, T.D. et al., "Ionic Conductivity of Conjugated Water-Soluble Rigid-Rod Polymers," Journal of Polymer Science: Part B: Polymer Physics, vol. 31 pp. 1941-1950, 1993.
Edman, L. et al., "Transport properties of the Solid Polymer Electrolyte System P(EO)nLiTFSI," Journal of Physical Chemistry B, 2000; vol. 104, No. 15, pp. 3476-3480.
Florjanczyk, Z. et al., "Polymer-in-Salt Electrolytes Based on Acrylonitrile/Butyl Acrylate Copolymers and Lithium Salts," Journal of Physical Chemistry B, 2004, vol. 108, pp. 14907-14914.
Kösters, J. et al., "Ion Transport Effects in a Solid Polymer Electrolyte Due to Salt Substitution and Addition Using an Ionic Liquid," Journal of Physical Chemistry B, 2013, vol. 117, pp. 2527-2534.

Lesch, V. et al., "A Combined theoretical and experimental study of the Influence of Different anion ratios on lithium ion dynamics in ionic liquids," Journal of Physical Chemistry B, 2014, vol. 118, No. 26, pp. 7367-7375.
Liew, C.-W. et al., "Characterization of ionic liquid added poly(vinyl alcohol)-based proton conducting polymer electrolytes and electrochemical studies on the supercapacitors," International Journal of Hydrogen Energy, vol. 40, pp. 852-862, 2015.
OPI Online Courses, "Insulator, Semiconductor Conductor," (online), Jul. 1, 2012.
Santhosh, P. et al., "Preparation and properties of new cross-linked polyurethane acrylate electrolytes for lithium batteries," Journal of Power Sources 160, pp. 609-620, 2006.
Sigma Aldritch Materials Science Products. Pi-conjugated Polymers. Jun. 5, 2014 (Jun. 5, 2014) [retrieved on Aug. 9, 2016]. Retrieved from the Internet: <URL: http://www.sigmaaldrich.com/materials-science/material-science-products.html? TablePage=111775702>. entire document.
Solvay. Ryton PPS. Feb. 7, 2015 (Feb. 7, 2015) [retrieved on Aug. 9, 2016]. Retrieved from the Internet: <URL: http://www.solvay.com/en/markets-and-products/featured-products/Ryton-PPS.htmlf>. entire document.
Tokito et al. Electrical Conductivity and Optical Properties of Poly(p-phenylene sulfide) doped with Some Organic Acceptors. Polymer Journal, vol. 17, No. 8, pp. 959-968. 1985. Retrieved from the Internet<URL:HTTP://www.nature.com/pj/journal/v17/n8/pdf/pj 1985103a.pdf.> entire document.
Wikipedia entry of Electrolyte. https://en.wikipedia.org/wiki/Electrolyte. Downloaded Feb. 1, 2019.
Yang, Y. et al., "Effect of Lithium Iodide Addition on Poly(ethylene oxide)-Poly(vinylidene fluoride) Polymer-Blend Electrolyte for dye-Sensitized Nanocrystalline Solar Cell," Journal of Physical Chemistry B, vol. 112, pp. 6594-6602, 2008.
Translated Text of the First Office Action, dated Aug. 7, 2018, from related Chinese Patent Application No. 2015/80018411.6.
Extended European Search Report, dated Oct. 8, 2018, from related European Patent Application No. 16804487.3, filed on Jan. 4, 2018.
Extended European Search Report, dated Oct. 5, 2018, from related European Patent Application No. 16804636.5, filed on Jan. 4, 2018.
Extended European Search Report, dated Dec. 13, 2018, from related European Patent Application No. 16808115.6, filed on Jun. 7, 2016.
Supplementary European Search Report, dated Oct. 15, 2018, from related European Patent Application No. 16808165.1, filed on Jun. 8, 2016.
International Search Report and the Written Opinion of the International Searching Authority, dated Apr. 5, 2018 from related PCT/US2018/015146 filed on Jan. 25, 2018.
Written Opinion of the Singapore Intellectual Property Office, dated Jul. 31, 2018, from related Singapore Patent Application No. SG2018/4525517527Y.
Hayashi, A. et al., "Superionic glass-ceramic electrolytes for room-temperature rechargeable sodium batteries," Nature Communications, 3:856, pp. 1-5, Macmillan Publishers Limited (May 22, 2012).
Moharram, M.A. et al., "Electrical Conductivity of Poly(acrylic acid)—Polyacrylamide Complexes," Journal of Applied Polymer Science, vol. 68, pp. 2049-2055, John Wiley & Sons, Inc. (1998).
Wu, G.M. et al., "Alkaline Zn-air and Al-air cells based on novel solid PVA/PAA polymer electrolyte membranes," Journal of Membrane Science, 280, pp. 802-808, Elsevier B.V. (2006; published online Apr. 4, 2006).
Zhang, Z. et al., "All-solid-state Al--air batteries with polymer alkaline gel electrolyte," Journal of Power Sources., 251, pp. 470-475, Elsevier B.V (2014).

\* cited by examiner

ALKALINE METAL-AIR BATTERY CATHODE

FIELD OF THE INVENTION

The present invention generally relates to an electrochemical battery, and more particularly to a metal-air battery and its component cathode.

BACKGROUND OF THE INVENTION

A metal-air cell is an electrochemical cell that uses an anode made of a metal anode and oxygen from the air as a cathode depolarizer (fuel). Since oxygen is not stored in the cell, the capacity and energy density of metal-air cells can be very high. Specific energy for a zinc-air system and other metal air battery systems are shown in Table 1. The specific energy of zinc-air cells surpasses Li ion by a wide margin.

TABLE 1

| Battery type | Theoretical specific energy, Wh/kg (including oxygen) | Theoretical specific energy, Wh/kg (excluding oxygen) | Open-circuit voltage, V |
|---|---|---|---|
| Aluminum-air | 4300 | 8140 | 1.2 |
| Calcium-air | 2990 | 4180 | 3.12 |
| Magnesium-air | 2789 | 6462 | 2.93 |
| Potassium-air | 935 | 1700 | 2.48 |
| Sodium-air | 1677 | 2260 | 2.3 |
| Lithium-air | 5210 | 11140 | 2.91 |
| Zinc-air | 1090 | 1350 | 1.65 |
| Lithium-ion battery | N/A | 265 | 3.8 |

During discharge, the anode in a metal-air cell undergoes oxidation reactions typical for the particular metal. The reaction mechanism is usually multi-step, with intermediates depending on the electrolyte. Typical anode discharge reactions for alkaline zinc-air cell are represented by equations 1-4.

$$Zn + 4OH^- \rightarrow Zn(OH)_4^{2-} + 2e^- \quad (1)$$

$$Zn + 2OH^- \rightarrow Zn(OH)_2 + 2e^- \quad (2)$$

$$Zn + 2OH^- \rightarrow ZnO + H_2O + 2e^- \quad (3)$$

$$Zn(OH)_2 \rightarrow ZnO + H_2O \quad (4)$$

The critical component of all metal-air cells is the air electrode. Unlike traditional battery cathodes, the air electrode can function mostly as a catalytic matrix for oxygen reduction and also acts as cathode current collector, while oxygen is supplied from the air outside the battery which is usually atmospheric air. The cathode reaction sequence for alkaline aqueous electrolytes is described by the following equations:

$$O_2 + 2e^- + H_2O \rightarrow O_2H^- + OH^- \quad (5)$$

$$O_2H^- \rightarrow OH^- + \tfrac{1}{2}O_2 \quad (6)$$

Since oxygen is supplied from the outside air, the positive electrode itself can be very thin as it is needed only to conduct electrons and catalyze the oxygen to hydroxyl reaction. A variety of carbons, potassium permanganate, manganese dioxide, cobalt tetrapyrazinoporphyrazine derivatives, perovskites, titanium doped manganese dioxide, cobalt oxides, graphene, Ketjen Black, doped Ketjen black, carbon nanotubes, carbon fiber, cobalt manganese oxides, electrically conductive polymers and intrinsically conductive polymers, combinations thereof and other compounds have been reported to catalyze chemical decomposition of peroxides via reaction (6).

Typical air electrode cathode structures usually contain multiple layers, including an air diffusing layer, a hydrophobic PTFE layer, a catalytic layer where carbon is mixed with a catalyst which is active to improve peroxide decomposition. The cathode is separated from the anode by a separator and barrier layer, wettable to electrolyte, and capable of preventing the metal anode from direct contact with the cathode.

Air holes, facing the cathode, are used to provide adequate air supply. Before a metal-air cell is needed for use it must be protected from the external environment. An adhesive and gas differentiating tab covering the vent holes is used to prevent most of oxygen from freely entering the cell. The tab is removed prior to use to enable the cathode to freely air up.

Zinc-air cells are one of the most commonly used metal-air systems. The cell demonstrates higher energy density compared to alkaline cells. Disadvantages of this system include relatively low rate capability and susceptibility to environment conditions. Zinc-air cells typically perform well on low continuous current drains, but can provide insufficient service on intermittent and high rate tests.

Zinc-air cell construction is typically a coin cell design, which includes a bottom can with air holes, a cathode structure, including hydrophobic and barrier layers, on top of it, followed by separator. As the air electrode is thin, most of the cell volume is taken by zinc anode. Larger cells, typically in prismatic format, require a complicated air delivery system to sustain adequate performance. Cylindrical (e.g. AA or LR6 sized) zinc-air designs usually result in cell cost prohibitively high for the alkaline category, and require complicated cathode designs and manufacturing processes, air delivery paths and the need for welding a cathode current collector to the positive terminal assembly.

Typical primary zinc, manganese dioxide ("Zn/$MnO_2$") or alkaline batteries can provide good performance on variety of tests, including intermittent, with low material and manufacturing costs. However, battery capacity and hence service life is limited by amount of electrochemically active ingredients such as $MnO_2$ and zinc which can be packed into the cell.

In zinc-air and air assisted zinc-$MnO_2$ batteries the anode material and associated electrochemical reactions are essentially the same as for Zn/$MnO_2$. However, in air assisted batteries, also known as air recovery or air restored batteries, the cathode can be recharged or restored by air. When the cell is not in use, or when the discharge rate is sufficiently low, atmospheric oxygen can enter the cell through the air holes and reacts with the air cathode, recharging manganese oxyhydrate back to dioxide:

$$\tfrac{1}{2}O_2 + MnOOH \rightarrow MnO_2 + OH^- \quad (7)$$

At high discharge rates, an air assisted battery can operate like a conventional alkaline cell reducing fresh manganese dioxide. The cathode can be wetted with electrolyte for the $MnO_2$ reduction to occur. At the same time a typical cathode must enable oxygen ingress as oxygen has low solubility in KOH solutions.

Air assisted batteries are particularly useful in intermittent use applications and can provide substantial performance improvement compared to traditional alkaline batteries. However, design of the air assisted batteries is as complicated as that of zinc-air cells, making them difficult to manufacture and costly. Because of these limitations, no practical cylindrically shaped air assisted battery has been mass produced to date. Therefore, the need for low cost and easy to manufacture battery with improved run time in consumer applications is still unfulfilled, and there exists a need for a metal-air battery that can operate in intermittent and high rate use applications.

SUMMARY OF THE INVENTION

According to an aspect, an electrochemical metal-air battery with an air electrode component which comprises a solid ionically conducting polymer material, which is used in the air electrode and is referred to in this application as a solid ionically conducting polymer material.

In an aspect a metal-air battery comprising: an air electrode that include: an electrically conductive material, and a solid ionically conducting polymer material; a negative electrode comprising a first electrochemically active metal; and an ionically conducting, dielectric non-electrochemically active material interposed between the air electrode and the negative electrode and in contact with the air electrode, wherein the air electrode acts to reduce oxygen when the air electrode is exposed to an oxygen gas source and when the battery is under load.

Further aspects of the metal-air battery can include one or more of the following:

The solid ionically conducting polymer material has a crystallinity greater than 30%;

The solid ionically conducting polymer material has a melting temperature;

The solid ionically conducting polymer material has a glassy state;

The solid ionically conducting polymer material has both at least one cationic and anionic diffusing ion, wherein at least one diffusing ion is mobile in the glassy state;

The solid ionically conducting polymer material has a plurality of charge transfer complexes;

The solid ionically conducting polymer material comprises a plurality of monomers, and wherein each charge transfer complex is positioned on a monomer;

Electronic conductivity of the solid ionically conducting polymer material is less than $1\times10^{-8}$ S/cm at room temperature;

The glassy state exists at temperatures below the melting temperature of the solid ionically conducting polymer material; at least one cationic diffusing ion comprises an alkali metal, an alkaline earth metal, a transition metal, or a post transition metal:

The solid ionically conducting polymer material comprises a plurality of monomers and wherein there is at least one anionic diffusing ion per monomer.

The solid ionically conducting polymer material comprises a plurality of monomers and wherein there is at least one cationic diffusing ion per monomer;

There is at least one mole of the cationic diffusing ion per liter of solid ionically conducting polymer material;

The charge transfer complex is formed by the reaction of a polymer, electron acceptor, and an ionic compound, wherein each cationic and anionic diffusing ion is a reaction product of the ionic compound;

The solid ionically conducting polymer material is formed from at least one ionic compound, wherein the ionic compound comprises each at least one cationic and anionic diffusing ion;

The solid ionically conducting polymer material is a thermoplastic.

The charge transfer complex is formed by the reaction of a polymer and an electron acceptor;

The melting temperature of the solid ionically conducting polymer material is greater than 250° C.;

Each at least one cationic and anionic diffusing ion have a diffusivity, wherein the cationic diffusivity is greater than the anionic diffusivity;

The cationic transference number of the solid ionically conducting polymer material is greater than 0.5;

The solid ionically conducting polymer material comprises lithium, and wherein the concentration of lithium is greater than 3 moles of lithium per liter of solid ionically conducting polymer material;

The cationic diffusing ion comprises lithium;

The diffusing cation is monovalent;

The valence of the diffusing cation is greater than one;

The air cathode produces hydroxide ion when it reduces oxygen, and wherein the solid ionically conducting polymer material ionically conducts hydroxide ion;

The diffusing anion is a hydroxide ion;

The diffusing anion is monovalent;

Both the diffusing anion and the diffusing cation are monovalent;

The at least one cationic and anionic diffusing ion have a diffusivity, wherein the anionic diffusivity is greater than the cationic diffusivity;

The cationic transference number of the solid ionically conducting polymer material is equal to or less than 0.5, and greater than zero;

The solid ionically conducting polymer material comprises a plurality of monomers, wherein each monomer comprises an aromatic or heterocyclic ring structure positioned in the backbone of the monomer;

The solid ionically conducting polymer material includes a heteroatom incorporated in the ring structure or positioned on the backbone adjacent to the ring structure and the heteroatom is selected from the group consisting of sulfur, oxygen or nitrogen;

A heteroatom is positioned on the backbone of the monomer adjacent the ring structure of the solid ionically conducting polymer material;

A heteroatom is positioned on the backbone of the monomer adjacent the ring structure of the solid ionically conducting polymer material, wherein the heteroatom is sulfur;

The solid ionically conducting polymer material is pi-conjugated;

The solid ionically conducting polymer material comprises a plurality of monomers, wherein the molecular weight of each monomer is greater than 100 grams/mole;

The solid ionically conducting polymer material is hydrophilic;

The ionic conductivity of solid ionically conducting polymer material is isotropic;

The solid ionically conducting polymer material is non-flammable;

The Young's modulus of the solid ionically conducting polymer material is equal to or greater than 3.0 MPa;

The solid ionically conducting polymer material becomes ionically conductive after being doped by an electron acceptor in the presence of an ionic compound that either contains both a cationic and anionic diffusing ion or is convertible into both the cationic and anionic diffusing ion via oxidation by the electron acceptor;

The solid ionically conducting polymer material is formed from the reaction product of a base polymer, electron acceptor and an ionic compound, and wherein the base polymer can be a conjugated polymer, PPS or a liquid crystal polymer;

The air electrode further comprises a second electrochemically active material, which may comprise a metal oxide, which may be manganese dioxide;

The first electrochemically active material comprises zinc; The first electrochemically active material comprises zinc, aluminum, calcium, magnesium, potassium, sodium or lithium;

The air electrode further comprises a second electrochemically active material, wherein the second electrochemically active material is intermixed with the electrically conductive material and the solid ionically conductive polymer material;

The ionically conducting, dielectric non-electrochemically active material comprises both a nonwoven separator disposed adjacent the air electrode and an aqueous electrolyte;

The electrically conductive material comprises carbon;

The battery is non-aqueous and the ionically conducting, dielectric non-electrochemically active material comprises solid ionically conducting polymer material;

The ionically conducting, dielectric non-electrochemically active material comprises both a nonwoven separator disposed adjacent the air electrode and an aqueous electrolyte;

The electrically conductive material is mixed with the solid ionically conducting polymer material and wherein the air electrode is thermoplastic; and The oxygen gas source is an air source, wherein the air source includes a first concentration of oxygen, carbon dioxide and water vapor gas, wherein the battery further comprises an air differentiation system fluidly interposed between the air electrode and the air source, and wherein the air differentiation system supplies the air electrode with a second concentration of oxygen, carbon dioxide and water vapor gas, and wherein the air differentiation system affects the concentration of oxygen reaching the air electrode when battery is under load, such that the second concentration of oxygen is greater than the first concentration of oxygen, wherein the air differentiation system affects the concentration of carbon dioxide, wherein the second concentration of carbon dioxide is less than the first concentration of carbon dioxide, wherein the air differentiation system affects the concentration of water, wherein the second concentration of water is less than the first concentration of water, wherein the air differentiation system comprises the solid ionically conducting polymer material, or wherein the air source is atmospheric air and wherein the battery is disposed within an enclosure having an air supply port, wherein the air supply port allows atmospheric air to flow to the air electrode.

An aspect and object of the battery is the ionic mobility provided by the solid ionically conducting polymer material, specifically:

The ionic conductivity of the solid ionically conducting polymer material is greater than $1.0 \times 10^{-5}$ S/cm at room temperature;

The solid ionically conducting polymer material comprises a single cationic diffusing ion, wherein the diffusivity of the cationic diffusing ion is greater than $1.0 \times 10^{-12}$ m$^2$/s at room temperature;

The solid ionically conducting polymer material comprises a single anionic diffusing ion, wherein the diffusivity of the anionic diffusing ion is greater than $1.0 \times 10^{-12}$ m$^2$/s at room temperature;

The solid ionically conducting polymer material, wherein one of the at least cationic diffusing ion, has a diffusivity greater than $1.0 \times 10^{-12}$ m$^2$/s;

The solid ionically conducting polymer material, wherein one of the at least one anionic diffusing ion has a diffusivity greater than $1.0 \times 10^{-12}$ m$^2$/s;

The solid ionically conducting polymer material, wherein one of both the at least one anionic diffusing ion and at least one cationic diffusing ion has a diffusivity greater than $1.0 \times 10^{-12}$ m$^2$/s;

The solid ionically conducting polymer material has an ionic conductivity greater than $1 \times 10^{-4}$ S/cm at room temperature;

The solid ionically conducting polymer material has an ionic conductivity greater than $1 \times 10^{-3}$ S/cm at 80° C.;

The solid ionically conducting polymer material has an ionic conductivity greater than $1 \times 10^{-5}$ S/cm at −40° C.; and The cationic diffusing ion comprises lithium, and wherein the diffusivity of lithium ion and the hydroxide ion are both greater than $1.0 \times 10^{-13}$ m$^2$/s at room temperature.

In an aspect, the battery can be composed with one or more of the following attributes:

The electrically conducting material comprises 10-30 percent by weight of the air electrode;

The solid ionically conducting polymer material comprises 5-50 percent by weight of the air electrode;

The second electrochemically active material comprises 10-70 percent by weight of the air electrode;

The air cathode comprises an oxygen reduction catalyst, which can be selected from a group comprising carbons, potassium permanganate, manganese dioxide, cobalt tetrapyrazinoporphyrazine derivatives, perovskites, titanium doped manganese dioxide, cobalt oxides, graphene, Ketjen Black, doped Ketjen black, carbon nanotubes, carbon fiber, cobalt manganese oxides, electrically conductive polymers and intrinsically conductive polymers, and combinations thereof;

The air electrode comprises manganese dioxide, and the manganese dioxide is selected from a group comprising β-MnO2 (pyrolusite), ramsdellite, γ-MnO2, ε-MnO$_2$, λ-MnO$_2$, EMD, CMD, and combinations thereof;

The electrically conductive material comprises carbon, and the ratio of weight of manganese dioxide to weight of carbon is greater than 2:1;

The first electrochemically active material comprises zinc, and wherein the ratio of weight of zinc to weight of manganese dioxide is greater than 1:1;

The ratio of weight of manganese dioxide to weight of ionically conducting polymer material in the air electrode is greater than 1:1;

The metal-air battery further comprises a metal can which acts as the positive current collector, wherein the air electrode is in electrical communication with the can;

The can is cylindrical, and the air cathode is annularly shaped;

The can is AA (LR6) sized; and

The oxygen gas permeability of the solid ionically conducting polymer material is greater that its water permeability; and An AA sized cell comprising the air electrode containing the solid kionically conducting polymer material demonstrated greater than 3 Ah capacity during: Continuous constant current discharge at current between 150 and 300 mA with 0.8 V voltage cutoff; Intermittent discharge at current between 150 and 300 mA cutoff applied for 1 hour, followed by 1-hour rest period (0.8V voltage cutoff; Continuous constant current discharge at 50 mA to 1.0V voltage cutoff;

Intermittent discharge at 50 mA with applied for 1 hour, followed by 1-hour rest period (1.0 voltage cutoff); Continuous constant resistance discharge at 3.9 Ohm to 0.8V voltage cutoff; Intermittent constant resistance discharge when 3.9 Ohm resistance is applied for 1 hour, followed by 1-hour rest period (0.8V voltage cutoff); Continuous constant resistance discharge of at 42 Ohm to 1.0 voltage cutoff; and Intermittent constant resistance discharge when 42 Ohm resistance is applied for 15 seconds, followed by 45-second rest period (1.0V voltage cutoff).

In an aspect, a method of manufacturing an air electrode can comprise one or more of the following steps:

Mixing a polymer with an ionic compound and an electron acceptor to create a first mixture;

Heating the first mixture to form, the first mixture into solid ionically conducting polymer material;

Mixing the solid ionically conducting polymer material with an electrically conductive material to make a second mixture which is reactive to reduce oxygen and ionically conduct hydroxyl ions.

In an aspect, a method of manufacturing an air electrode can further comprise one or more of the following steps in combination with the previous aspect:

In the second mixture mixing step a codepolarizer is added to the second mixture;

The codepolarizer is manganese dioxide.

In the first mixing step a codepolarizer is added to the first mixture.

The electrically conductive material comprises carbon.

A forming step is used, wherein the second mixture is formed into the air cathode.

In the forming step pressure is applied to the second mixture to thermoform the second mixture into an air cathode, wherein the air cathode is formed into a film, or wherein the air cathode is formed into an annulus;

The base polymer is PPS, PEEK, LCP, PPy, or a combination thereof;

The dopant is selected from DDQ, TCNE, chloranil, SO3, ozone, a transition metal oxide, MnO2, oxygen and air;

The ionic compound is a salt, hydroxide, oxide or other material containing hydroxide ions or convertible to hydroxide;

The ionic compound comprises LiOH, NaOH, KOH, Li2O, or LiNO3;

In the heating step the first mixture is heated to a temperature between 250 and 450 deg. C.;

In the heating step, pressure is applied to the first mixture while it is being heated, and the pressure can be between 300 and 500 psi;

In the second mixture step the manganese dioxide is encapsulated by solid ionically conducting polymer material;

In the forming step the air electrode is extruded;

In the second mixture mixing step a catalyst is added to the mixture;

In the second mixture mixing step a hydrophobic compound is added to the mixture;

In the second mixture mixing step a carbon dioxide adsorbing compound is added to the mixture; and A locating step is used to position the air cathode within a can and adjacent an inner surface of the can, wherein the air cathode can be shaped as an annulus, and wherein a second annulus shaped cathode portion can be located adjacent to both the inner surface of the can and the air cathode, and wherein the second cathode portion can comprise or can be free of the solid ionically conducting polymer material.

These and other features, advantages, and objects will be further understood and appreciated by those skilled in the art by reference to the following specification, claims, and appended drawings.

DETAILED DESCRIPTION OF THE PREFERRED EMBODIMENTS

Figure 1:
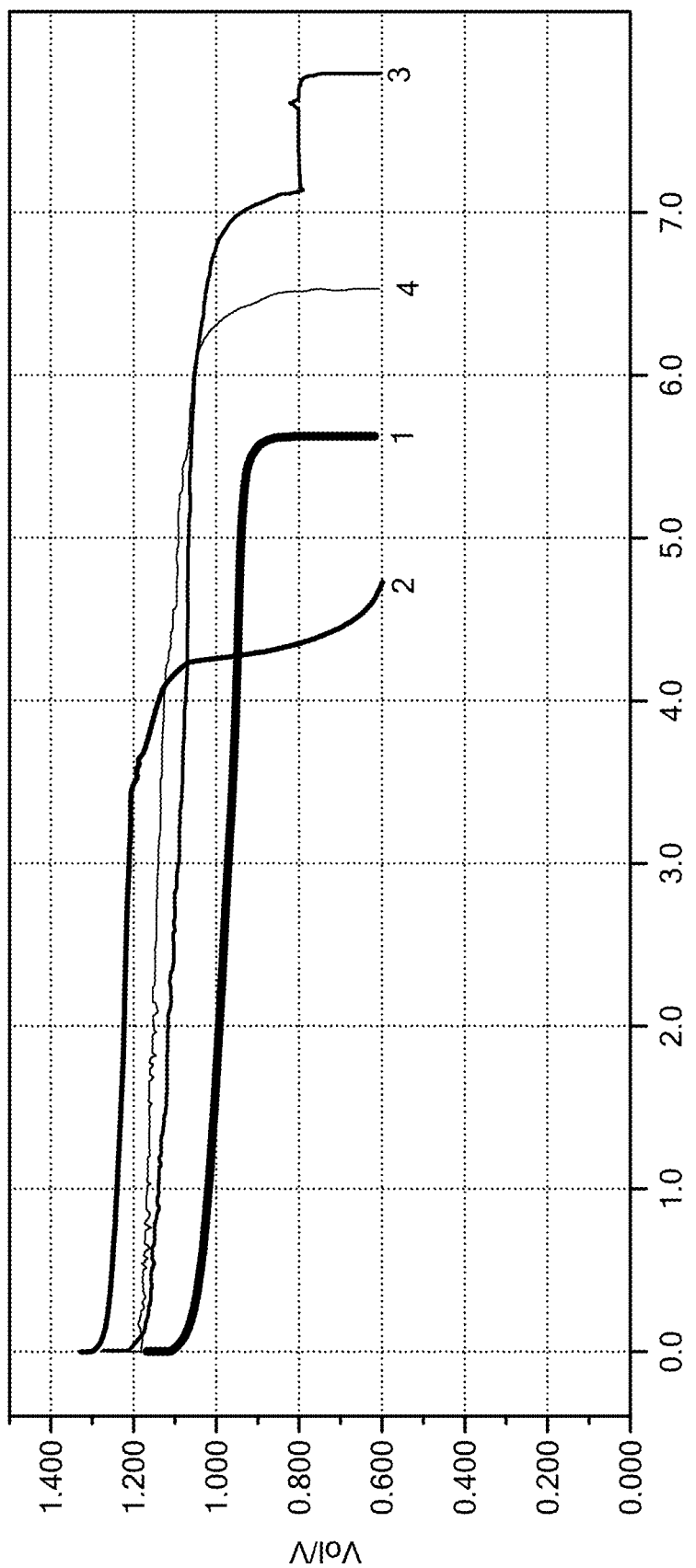
FIG. 1 is a discharge curve showing cell performance using four different electrically conductive carbons.

The present patent application claims priority from U.S. patent application Ser. No. 15/169,160 which claims priority from U.S. Provisional Patent Application No. 62/169,812, filed Jun. 2, 2015; and is a Continuation-In-Part application of U.S. patent application Ser. No. 15/148,085, filed May 6, 2016 which (a) claims priority from U.S. Provisional Patent Application No. 62/158,841, filed May 8, 2015 and (b) is a Continuation-In-Part application of both (i) U.S. patent application Ser. No. 14/559,430, filed Dec. 3, 2014, which claims priority from U.S. Provisional Patent Application No. 61/911,049, filed Dec. 3, 2013; and (ii) from U.S. patent application Ser. No. 13/861,170, filed Apr. 11, 2013, which claims priority from U.S. Provisional Patent Application No. 61/622,705, filed Apr. 11, 2012, the disclosures of which are incorporated by reference herein in their entirety.

The following explanations of terms are provided to better detail the descriptions of aspects, embodiments and objects that will be set forth in this section. Unless explained or defined otherwise, all technical and scientific terms used herein have the same meaning as commonly understood to one of ordinary skill in the art to which this disclosure belongs. In order to facilitate review of the various embodiments of the disclosure, the following explanations of specific terms are provided:

A depolarizer is a synonym of electrochemically active substance, i.e., a substance which changes its oxidation state, or partakes in a formation or breaking of chemical bonds, in a charge-transfer step of an electrochemical reaction and electrochemically active material. When an electrode has more than one electroactive substances they can be referred to as codepolarizers.

Thermoplastic is a characteristic of a plastic material or polymer to become pliable or moldable above a specific temperature often around or at its melting temperature and to solidify upon cooling.

Solid electrolytes include solvent free polymers, and ceramic compounds (crystalline and glasses).

A "Solid" is characterized by the ability to keep its shape over an indefinitely long period, and is distinguished and different from a material in a liquid phase. The atomic structure of solids can be either crystalline or amorphous. Solids can be mixed with or be components in composition structures.

For purposes of this application and its claims, a solid ionically conducting polymer material requires that that material be ionically conductive through the solid and not through any solvent, gel or liquid phase, unless it is otherwise described. For purposes of this application and its claims, gelled (or wet) polymers and other materials dependent on liquids for ionic conductivity are defined as not being solid electrolytes (solid ionically conducting polymer material) in that they rely on a liquid phase for their ionic conductivity.

A polymer is typically organic and comprised of carbon based macromolecules, each of which have one or more type of repeating units or monomers. Polymers are light-weight, ductile, usually non-conductive and melt at relatively low temperatures. Polymers can be made into products by injection, blow and other molding processes, extrusion, pressing, stamping, three dimensional printing, machining and other plastic processes. Polymers typically have a glassy state at temperatures below the glass transition temperature Tg. This glass temperature is a function of chain flexibility, and occurs when there is enough vibrational (thermal) energy in the system to create sufficient free-volume to permit sequences of segments of the polymer macromolecule to move together as a unit. However, in the glassy state of a polymer, there is no segmental motion of the polymer.

Polymers are distinguished from ceramics which are defined as inorganic, non-metallic materials; typically compounds consisting of metals covalently bonded to oxygen, nitrogen or carbon, brittle, strong and non-conducting.

The glass transition, which occurs in some polymers, is a midpoint temperature between the supercooled liquid state and a glassy state as a polymer material is cooled. The thermodynamic measurements of the glass transition are done by measuring a physical property of the polymer, e.g. volume, enthalpy or entropy and other derivative properties as a function of temperature. The glass transition temperature is observed on such a plot as a break in the selected property (volume of enthalpy) or from a change in slope (heat capacity or thermal expansion coefficient) at the transition temperature. Upon cooling a polymer from above the Tg to below the Tg, the polymer molecular mobility slows down until the polymer reaches its glassy state.

As a polymer can comprise both amorphous and crystalline phase, polymer crystallinity is the amount of this crystalline phase relative the amount of the polymer and is represented as a percentage. Crystallinity percentage can be calculated via x-ray diffraction of the polymer by analysis of the relative areas of the amorphous and crystalline phases.

A polymer film is generally described as a thin portion of polymer, but should be understood as equal to or less than 300 micrometers thick.

It is important to note that the ionic conductivity is different from electrical conductivity. Ionic conductivity depends on ionic diffusivity, and the properties are related by the Nernst-Einstein equation. Ionic conductivity and ionic diffusivity are both measures of ionic mobility. An ionic is mobile in a material if its diffusivity in the material is positive (greater than zero), or it contributes to a positive conductivity. All such ionic mobility measurements are taken at room temperature (around 21° C.), unless otherwise stated. As ionic mobility is affected by temperature, it can be difficult to detect at low temperatures. Equipment detection limits can be a factor in determining small mobility amounts. Mobility can be understood as diffusivity of an ion at least $1\times10^{-14}$ $m^2/s$ and preferably at least $1\times10^{-13}$ $m^2/s$, which both communicate an ion is mobile in a material.

A solid polymer ionically conducting material is a solid that comprises a polymer and that conducts ions as will be further described.

An aspect includes a method of synthesizing a solid ionically conducting polymer material from at least three distinct components: a polymer, a dopant and an ionic compound. The components and method of synthesis are chosen for the particular application of the material. The selection of the polymer, dopant and ionic compound may also vary based on the desired performance of the material. For example, the desired components and method of synthesis may be determined by optimization of a desired physical characteristic (e.g. ionic conductivity).

Synthesis:

The method of synthesis can also vary depending on the particular components and the desired form of the end material (e.g. film, particulate, etc.). However, the method includes the basic steps of mixing at least two of the components initially, adding the third component in an optional second mixing step, and heating the components/reactants to synthesizes the solid ionically conducting polymer material in a heating step. In one aspect of the invention, the resulting mixture can be optionally formed into a film of desired size. If the dopant was not present in the mixture produced in the first step, then it can be subsequently added to the mixture while heat and optionally pressure (positive pressure or vacuum) are applied. All three components can be present and mixed and heated to complete the synthesis of the solid ionically conducting polymer material in a single step. However, this heating step can be done when in a separate step from any mixing or can completed while mixing is being done. The heating step can be performed regardless of the form of the mixture (e.g. film, particulate, etc.) In an aspect of the synthesis method, all three components are mixed and then extruded into a film. The film is heated to complete the synthesis.

When the solid ionically conducting polymer material is synthesized, a color change occurs which can be visually observed as the reactants color is a relatively light color, and the solid ionically conducting polymer material is a relatively dark or black color. It is believed that this color change occurs as charge transfer complexes are being formed, and can occur gradually or quickly depending on the synthesis method.

An aspect of the method of synthesis is mixing the base polymer, ionic compound and dopant together and heating the mixture in a second step. As the dopant can be in the gas phase, the heating step can be performed in the presence of the dopant. The mixing step can be performed in an extruder, blender, mill or other equipment typical of plastic processing. The heating step can last several hours (e.g. twenty-four (24) hours) and the color change is a reliable indication that synthesis is complete or partially complete.

In an aspect of the synthesis method, the base polymer and ionic compound can be first mixed. The dopant is then mixed with the polymer-ionic compound mixture and heated. The heating can be applied to the mixture during the second mixture step or subsequent to the mixing step.

In another aspect of the synthesis method, the base polymer and the dopant are first mixed, and then heated.

This heating step can be applied after the mixing or during, and produces a color change indicating the formation of the charge transfer complexes and the reaction between the dopant and the base polymer. The ionic compound is then mixed to the reacted polymer dopant material to complete the formation of the solid ionically conducting polymer material.

Typical methods of adding the dopant are known to those skilled in the art and can include vapor doping of film containing the base polymer and ionic compound and other doping methods known to those skilled in the art. Upon doping the solid polymer material becomes ionically conductive, and it is believed that the doping acts to activate the ionic components of the solid polymer material so they are diffusing ions.

Other non-reactive components can be added to the above described mixtures during the initial mixing steps, secondary mixing steps or mixing steps subsequent to heating. Such other components include but are not limited to depolarizers or electrochemically active materials such as anode or cathode active materials, electrically conductive materials such as carbons, rheological agents such as binders or extrusion aids (e.g. ethylene propylene diene monomer "EPDM"), catalysts and other components useful to achieve the desired physical properties of the mixture.

Polymers that are useful as reactants in the synthesis of the solid ionically conducting polymer material are electron donors or polymers which can be oxidized by electron acceptors. Semi-crystalline polymers with a crystallinity index greater than 30%, and greater than 50% are suitable reactant polymers. Totally crystalline polymer materials such as liquid crystal polymers ("LCPs") are also useful as reactant polymers. LCPs are totally crystalline and therefore their crystallinity index is hereby defined as 100%. Undoped conjugated polymers and polymers such as polyphenylene sulfide ("PPS") are also suitable polymer reactants.

Polymers are typically not electrically conductive. For example, virgin PPS has electrical conductivity of $10^{-20}$ S cm$^{-1}$. Non-electrically conductive polymers are suitable reactant polymers.

In an aspect, polymers useful as reactants can possess an aromatic or heterocyclic component in the backbone of each repeating monomer group, and a heteroatom either incorporated in the heterocyclic ring or positioned along the backbone in a position adjacent the aromatic ring. The heteroatom can be located directly on the backbone or bonded to a carbon atom which is positioned directly on the backbone. In both cases where the heteroatom is located on the backbone or bonded to a carbon atom positioned on the backbone, the backbone atom is positioned on the backbone adjacent to an aromatic ring. Non-limiting examples of the polymers used in this aspect of the invention can be selected from the group including PPS, Poly(p-phenylene oxide) ("PPO"), LCPs, Polyether ether ketone ("PEEK"), Polyphthalamide ("PPA"), Polypyrrole, Polyaniline, and Polysulfone. Copolymers including monomers of the listed polymers and mixtures of these polymers may also be used. For example, copolymers of p-hydroxybenzoic acid can be appropriate liquid crystal polymer base polymers.

Table 2 details non-limiting examples of reactant polymers useful in the synthesis of the solid ionically conducting polymer material along with monomer structure and some physical property information which should be considered also non-limiting as polymers can take multiple forms which can affect their physical properties.

TABLE 2

| Polymer | Monomer Structure | Melting Pt. (C.) | MW |
| --- | --- | --- | --- |
| PPS polyphenylene sulfide | | 285 | 109 |
| PPO Poly (p-phenylene oxide) | | 262 | 92 |
| PEEK Polyether ether ketone | | 335 | 288 |
| PPA Polyphthalamide | | 312 | |

TABLE 2-continued

| Polymer | Monomer Structure | Melting Pt. (C.) | MW |
|---|---|---|---|
| Polypyrrole | | | |
| Polyaniline Poly-Phenylamine [C$_6$H$_4$NH]$_n$ | | 385 | 442 |
| Polysulfone | | | 240 |
| Xydar (LCP) | | | |
| Vectran Poly-paraphenylene terephthalamide [—CO—C$_6$H$_4$—CO—NH—C$_6$H$_4$—NH—]$_n$ | | | |
| Polyvinylidene fluoride (PVDF) | | 177° C. | |
| Polyacrylonitrile (PAN) | | 300° C. | |
| Polytetrafluoro-ethylene (PTFE) | | 327 | |
| Polyethylene (PE) | | 115-135 | |

Dopants that are useful as reactants in the synthesis of the solid ionically conducting polymer material are electron acceptors or oxidants. It is believed that the dopant acts to release ions for ionic transport and mobility, and it is believed to create a site analogous to a charge transfer complex or site within the polymer to allow for ionic conductivity. Non-limiting examples of useful dopants are quinones such as: 2,3-dicyano-5,6-dichlorodicyanoquinone (C$_8$Cl$_2$N$_2$O$_2$) also known as "DDQ", and tetrachloro-1,4-benzoquinone (C$_6$Cl$_4$O$_2$), also known as chloranil, tetracyanoethylene (C$_6$N$_4$) also known as TCNE, sulfur trioxide ("SO$_3$"), ozone (trioxygen or O$_3$), oxygen (O$_2$, including air), transition metal oxides including manganese dioxide ("MnO$_2$"), or any suitable electron acceptor, etc. and combinations thereof. Dopants that are temperature stable at the temperatures of the synthesis heating step are useful, and quinones and other dopants which are both temperature stable and strong oxidizers quinones are very useful. Table 3 provides a non-limiting listing of dopants, along with their chemical diagrams.

TABLE 3

| Dopant | Formula | Structure |
|---|---|---|
| 2,3-Dichloro-5,6-dicyano-1,4-benzoquinone (DDQ) | $C_6Cl_2(CN)_2O_2$ | (structure shown) |
| tetrachloro-1,4-benzoquinone (chloranil) | $C_6Cl_4O_2$ | (structure shown) |
| Tetracyanoethylene (TCNE) | $C_6N_4$ | (structure shown) |
| Sulfur Trioxide | $SO_3$ | |
| Ozone | $O_3$ | |
| Oxygen | $O_2$ | |
| Transition Metal Oxides | $MxO_y$, (M = Transition Metal, x and y are equal to or greater than 1) | |

Ionic compounds that are useful as reactants in the synthesis of the solid ionically conducting polymer material are compounds that release desired ions during the synthesis of the solid ionically conducting polymer material. The ionic compound is distinct from the dopant in that both an ionic compound and a dopant are required. Non-limiting examples include $Li_2O$, LiOH, NaOH, KOH, $LiNO_3$, $Na_2O$, MgO, $CaCl_2$, $MgCl_2$, $AlCl_3$, LiTFSI (lithium bis-trifluoromethanesulfonimide), LiFSI (Lithium bis(fluorosulfonyl)imide), Lithium bis(oxalato)borate ($LiB(C_2O_4)_2$ "LiBOB") and other lithium salts and combinations thereof. Hydrated forms (e.g. monohydride) of these compounds can be used to simplify handling of the compounds. Inorganic oxides, chlorides and hydroxide are suitable ionic compounds in that they dissociate during synthesis to create at least one anionic and cationic diffusing ion. Any such ionic compound that dissociates to create at least one anionic and cationic diffusing ion would similarly be suitable. Multiple ionic compounds can also be useful that result in multiple anionic and cationic diffusing ions can be preferred. The particular ionic compound included in the synthesis depends on the utility desired for the material. For example, in an application where it would be desired to have a hydroxide anion, a lithium hydroxide, or an oxide convertible to a hydroxide ion would be appropriate. As would be any hydroxide containing compound that releases a diffusing anion during synthesis. A non-limiting group of such hydroxide ionic compounds includes metals. The hydroxide ionic compounds can include alkaline metals, alkaline earth metals, transition metals, and post transition metals in a form that can produce both the desired cationic and anionic diffusing species are appropriate as synthesis reactant ionic compounds.

The purity of the materials is potentially important so as to prevent any unintended side reactions and to maximize the effectiveness of the synthesis reaction to produce a highly conductive material. Substantially pure reactants with generally high purities of the dopant, base polymer and the ionic compound are useful, and purities greater than 98% are more useful with even higher purities, e.g. LiOH: 99.6%, DDQ: >98%, and Chloranil: >99% also useful.

To further describe the utility of the solid ionically conductive polymer material and the versatility of the above described method of the synthesis of the solid ionically conducting polymer material, several classes of the solid ionically conducting polymer material useful for multiple electrochemical applications and distinguished by their application are described:

Example 1

PPS polymer was mixed with the ionic compound LiOH monohydrate in the proportion of 67% to 33% (by wt.), respectively, and mixed using jet milling. This undoped mixture can be extruded into a film or other shape prior to doping. A portion is extruded into a film to create an undoped film (of PPS and LiOH). DDQ dopant was added via vapor doping to the resulting mixture at a temperature between 250 and 325° C. for 30 minutes under moderate pressure (500-1000 PSI) to synthesize a solid ionically conducting polymer material (PPS/LiOH/DDQ). In an aspect, the solid ionically conducting polymer material PPS/LiOH/DDQ is synthesized in a particulate form by first mixing the DDQ dopant and base polymer PPS monometer. The ionic compound LiOH is added and the three component mixtures is heated between 250 and 325° C. to create the particulate form.

Electronic conductivity was measured using the potentiostatic method between blocking electrodes, and was determined to be about $6.5\times10^{-9}$ S/cm (less than $1\times10^{-8}$ S/cm).

Ionic diffusivity measurements were conducted on a compression molded particulate form of the PPS/LiOH/DDQ material using fundamental NMR techniques. Specifically, the diffusivity of lithium and hydroxide ions was evaluated by a pulsed gradient spin echo ("PGSE") lithium NMR method. The PGSE-NMR measurements were made using a Varian-S Direct Drive 300 (7.1 T) spectrometer. The solid polymer ionically conducting material, has a $Li^+$ diffusivity of $5.7\times10^{-11}$ $m^2/s$ at room temperature, and the diffusivity of the $OH^-$ ion was $4.1\times10^{-11}$ $m^2/s$ at room temperature. These diffusivity values can be used to calculate both an anionic and cationic transference number. Although related, the anionic transference number is more relevant in that the diffusivity of the hydroxide is important in alkaline batteries.

After synthesis, the solid ionically conducting polymer material film of 20 micron thickness was tested for air component permeability (i.e. oxygen, water, and carbon dioxide) at room temperature. The permeability of the solid ionically conducting polymer material film, and undoped film (also 20 microns in thickness) was compared against Zitex G-104 film from Saint-Gobain, (100 microns thick), and the results are detailed in Table 4 which details permeability results in units of moles gas/$cm^2$-sec.

TABLE 4

| Gas | Undoped Film | Example 1 Film | Zitex |
|---|---|---|---|
| Oxygen ($O_2$) | $2.1 \times 10^{-9}$ | $1 \times 10^{-8}$ | $2.1 \times 10^{-6}$ |
| Water ($H_2O$) | 0 | $1.3 \times 10^{-8}$ | $1.5 \times 10^{-8}$ |
| Carbon Dioxide ($CO_2$) | 0 | $1.4 \times 10^{-10}$ | $\times 10^{-10}$ |

Doping results in a significant change in the permeability properties solid polymer film. The synthesized solid polymer film shows some gas differentiating properties, and its oxygen permeability is important and can be contrasted relative its lower carbon dioxide permeability. The undoped polymer film, is impermeable relative both water and $CO_2$. In an aspect, a combination of a doped and undoped solid polymer film can provide water and carbon dioxide impermeability in a gas differentiation system.

Zinc-Air Battery:

The solid ionically conducting polymer material, which can be produced using high volume manufacturing processes, has applicability in metal-air cells. An aspect is an air cathode based on the solid ionically conducting polymer material and a metal-air cell comprising the air cathode.

The air cathode simplifies prior art metal-air cathodes by using a single layer comprising electrically conducting carbon powder intermixed with the solid ionically conducting polymer material. The electrically conductive carbon can be in the form of graphite, carbon black, graphenes, electrically conductive polymers, or mixtures thereof.

In an aspect, additional catalyst is added to the air electrode. Although the combination of the solid ionically conducting polymer material and the electrically conductive carbon powder provides sufficient catalytic rate capability, potassium permanganate, manganese dioxide, cobalt tetrapyrazinoporphyrazine derivatives, perovskites and other compounds are useful to further catalyze chemical decomposition of peroxides and thus can be optionally added.

Example 2

An air cathode is made by mixing the solid ionically conductive polymer material prepared in Example 1 with electrically conductive carbon powder in desired proportion and compression-molded onto an electrically conducting (e.g. metal) current collector which is electrically connected to a positive terminal of the cell.

Air electrodes were prepared by mixing the solid ionically conducting polymer material with variety of carbons: TIMCAL SUPER C45 Conductive Carbon Black (C45), Timcal SFG6 (synthetic graphite), A5303 carbon black from Ashbury and natural vein graphite nano 99 from Ashbury (N99). Carbon content was varied from 15 to 25% wt. %. Cathodes were punched to fit a 2032 coin cell. Zinc foil was used as the anode. Non-woven separator was soaked with aqueous 40% KOH solution. Two holes were drilled in the coin top facing the cathode. Cells were discharged at room temperature using a MTI coin cell tester at a 0.5 mA constant current.

Cathode parameters and test results are summarized in Table 5. Discharge curves are shown at FIG. 1. The cells with the air cathode demonstrate typical for Zn-air cells discharge behavior without any traditional catalyst (e.g. transition metal based) added to the mixture.

TABLE 5

| Cathode # | Carbon | C % | T (mil) | Wt (mg) | g/cc | OCV (V) | mAh |
|---|---|---|---|---|---|---|---|
| 1 | C45 | 15% | 23.3 | 102.7 | 0.553 | 1.2667 | 5.628 |
| 2 | N99 | 25% | 25.3 | 137.8 | 0.757 | 1.3343 | 4.742 |
| 3 | A5303 | 20% | 21.5 | 116.8 | 0.755 | 1.3405 | 7.864 |
| 4 | SFG6 | 25% | 29.2 | 166.3 | 0.791 | 1.3185 | 6.539 |

Air Assisted Zinc-MnO2 Battery:

In an air assisted zinc-manganese dioxide battery a second depolarizer or electrochemically active cathode material can be added in the form of $\beta\text{-}MnO_2$ (pyrolusite), ramsdellite, $\gamma\text{-}MnO_2$, $\varepsilon\text{-}MnO_2$, $\lambda\text{-}MnO_2$ and other $MnO_2$ phases or mixtures thereof, including, but not limited to, EMD and CMD. Although this Example is limited to an air assisted Zinc-$MnO_2$ system, other depolarizers can be added in other metal air systems. Such second depolarizers are added in the range of 30-70 wt. %.

Electrically conductive carbons such as the carbons listed in Example 2 are useful as are other electrically conductive carbons such as Ketjenblack EC-600 JD, and other conductive additives typical and known in the battery field. Such electrically conductive carbons are added in the range of 10-60 wt. %.

The solid ionically polymer material can be prepared independently or prepared during the preparation of the air cathode. In an aspect, the reactant polymer and the ionic compound are mixed with air and then heated to make the solid ionically conducting polymer material. In another aspect, the reactant polymer and the ionic compound are mixed with EMD or other depolarizer and then heated to make the solid ionically conducting polymer material. During heating, the mixture undergoes a color change indicating its reaction and transition into an ionically conductive material. After the heating step, KOH solution and the selected electrically conductive material is added in a second mixing step. If EMD had not already been added, then EMD can be included in the second mixing step. If EMD was included in the first mixing step, then additional EMD can optionally be added for open circuit voltage ("OCV") maintenance as the heating step can affect the air cathode OCV. The material exits the heating step as friable and is easily mixed and granulated in the second step, thus not requiring any regrinding. The second mixing step can produce granulates which are environmentally stable and ready for molding into the desired air cathode shape.

Figures 2A, 2B:
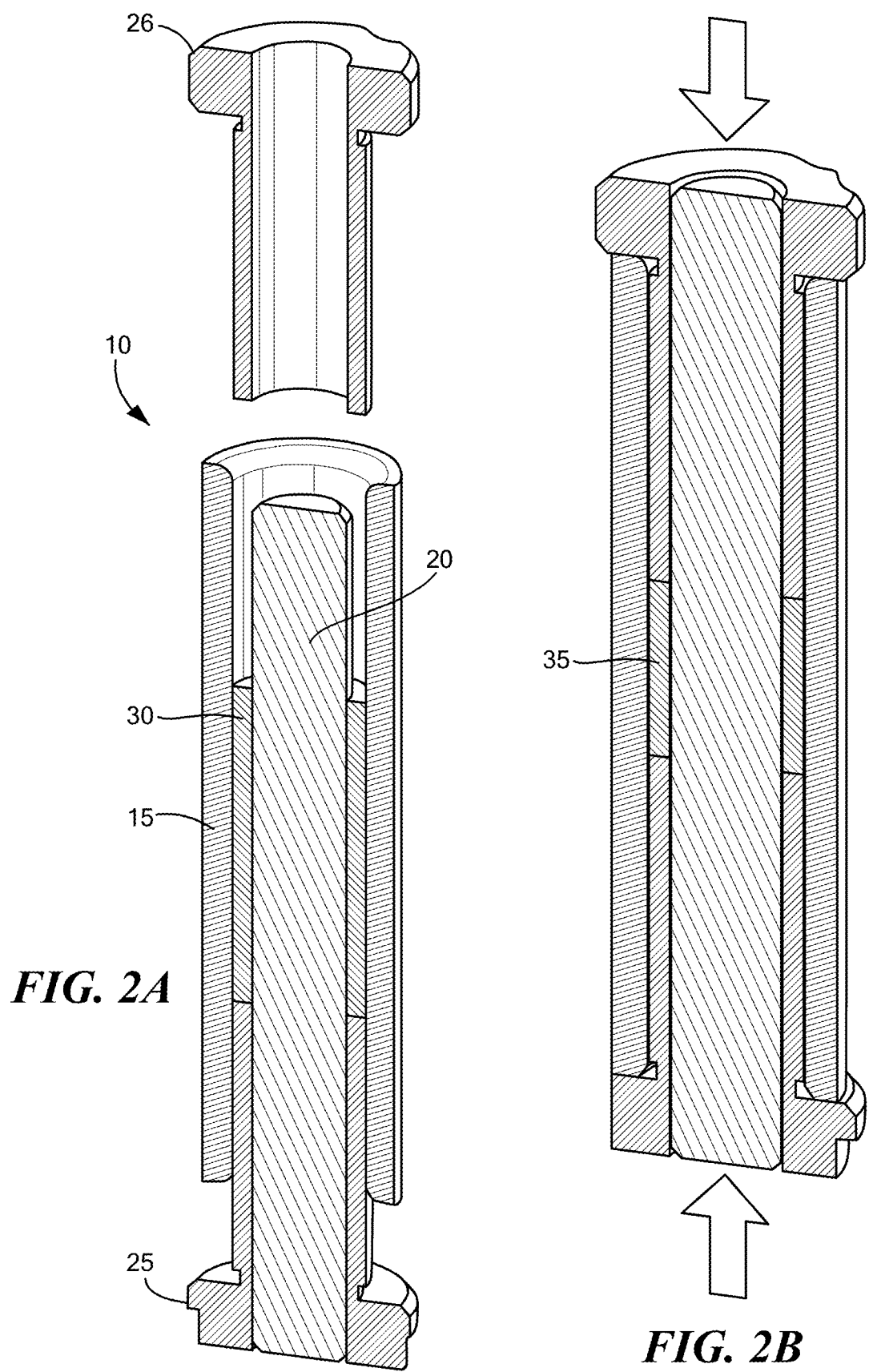
FIG. 2A is a cross-sectional representational view of a tool for preparing cathode sections.
FIG. 2B is a cross-sectional representational view of air cathode annular sections being formed by a tool.

In an aspect, the cathode can be prepared using a tool 10, which is shown in FIG. 2A, comprising a cylindrically shaped outer tube 15, a center pin 20, and end bushings 25 and 26 that are arranged to create an annular interior space. A desired amount of the cathode material powder 30 is loaded into the tool 10 with inserted center pin 20. The top end bushing 26 is inserted and the tool is placed under a press.

Referring to FIG. 2B, an external pressure is applied (shown by arrows) to drive end bushings to a pre-defined depth. The resulting hollow cathode ring 35 can then be transferred into a can.

Figure 3:
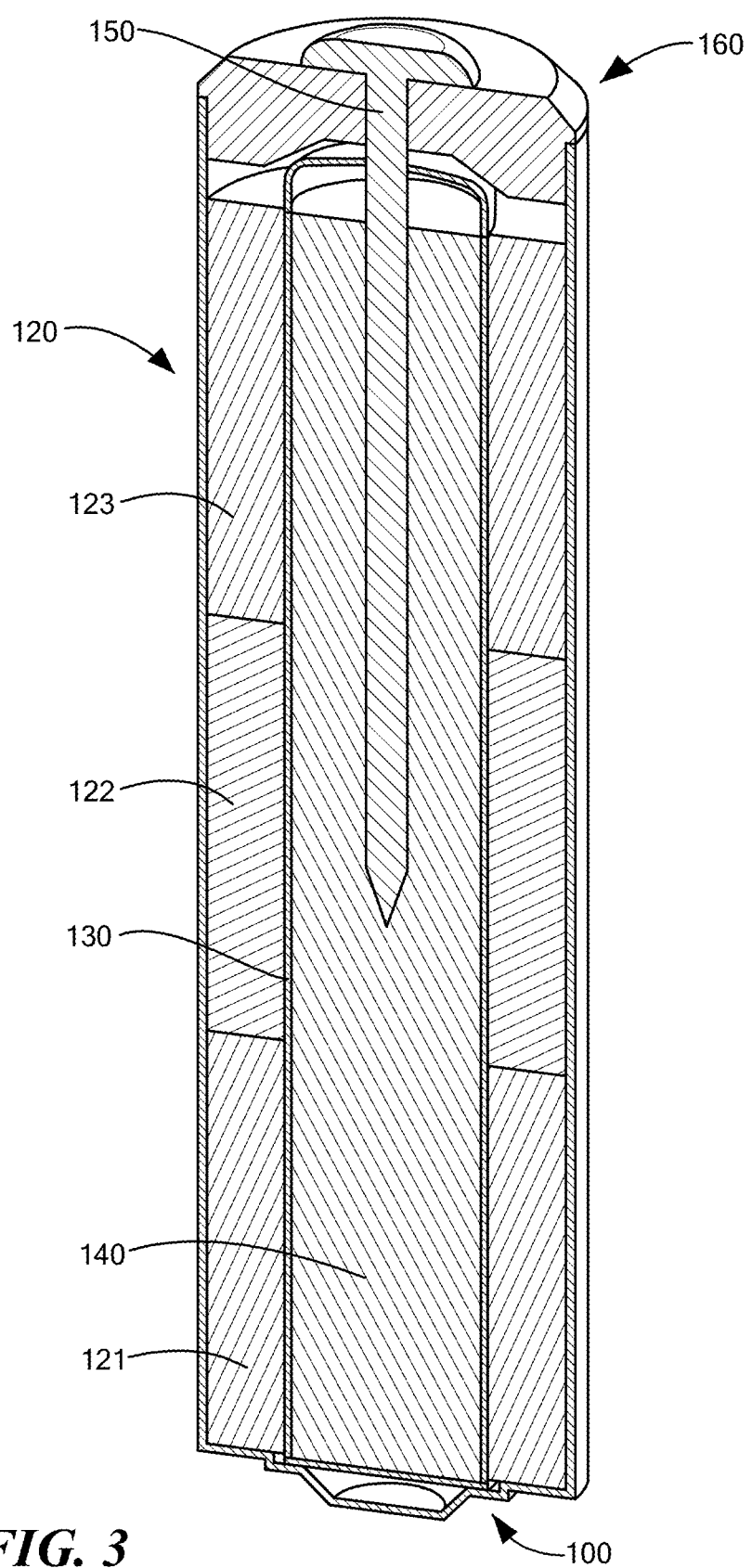
FIG. 3 is a cross sectional view of an electrochemical battery cell.

Referring to FIG. 3, a tool 110 including a standard ANSI sized cylindrical can 100 is shown, which is useful to build the air assisted battery.

In this aspect, three cathode rings 121, 122, and 123 are used to build the cell. After all cathode sections are transferred into the can, additional pressure can be applied to press the cathode against the can wall, ensuring intimate contact between the air cathode 120 and the can 100.

A separator assembly 130 is placed into the can 100 after the cathode is in place and positioned adjacent the air cathode 120. The separator assembly is in a fashion typical for alkaline cells. Separator material can be selected from separators traditionally used in the industry, for example non-woven materials. Measured amount of typical electrolyte used in alkaline cells, such as 40% KOH solution, can be added to the separator to wet it and enable its ionic conductivity. After electrolyte is absorbed, the inner volume is filled with the measured amount of zinc material to form an anode 140. A conductive nail 150, negative terminal 160 and sealing assembly (not shown) is then placed into the cell and locked in place.

In another aspect, cathode can be made by loading desired amount of cathode material powder directly into the bottom of the can and then driving a center pin through the cathode material to form the cathode. This cathode making method is typical of commercial alkaline battery cathode manufacturing is called impact molding because of the impact force used to shape the cathode. The can is first placed in a reinforcing cylinder before the center pin impact creates the annulus shaped cathode so as to maintain the can integrity.

Anode material can be in the form of slurry, comprising alloyed zinc powder, KOH, gelling agent and stabilizing additives, such as zinc oxide, indium hydroxide, organic surfactants, and others. Anode slurry is prepared and handled in a way typical of commercial alkaline batteries.

Except for the cathode material powder preparation, all materials and processes can be typical for the alkaline industry and familiar to those skilled in the art. Therefore, many of the existing processes and equipment can be utilized in the manufacture of the battery.

The solid ionically conducting polymer material retains the thermoplastic physical properties of its base polymer. For example, it is capable of being thermoformed, extruded or otherwise shaped into a myriad of webs, annulus, powders, meshes, convolutes, coatings, films, and other useful forms. As the cathode materials are encapsulated by the solid ionically conducting polymer material the air cathode is itself thermoplastic as it can be molded while maintaining this encapsulation. This property solid ionically conducting polymer material is particularly useful in a metal-air or air-assisted battery in that the air electrode can now be made of a single layer in a plurality of shapes.

Like most polymers, the solid ionically conducting polymer material can be mixed with materials to alter its physical properties. For metal-air or air-assisted battery, differential ingress of oxygen, water and carbon dioxide is preferred. Hydrophobicity can be engineered into the metal-air or air-assisted battery air electrode by the addition of a hydrophobic material such as a Teflon®, liquid crystal polymers or other known water barriers. Carbon dioxide can be rendered impermeable with the use of an appropriate film, or adsorbed by an appropriate compound such as a zeolite with engineered or naturally occurring adsorption sites. Such a carbon dioxide zeolite can be mixed with the solid ionically conducting polymer material or located in a film between the cathode and any air access hole to create a gas differentiation system that enables oxygen to enter the cell and reach the air electrode at a rate necessary to enable the desired electrochemical drain rates, while selectively preventing carbon dioxide and water permeability.

Air is supplied into the cell depicted in FIG. 3 through air holes (not shown), positioned in the seal assembly, and/or in the can walls. A gas differentiation system can be used to protect the cell from leakage and such a membrane can be located intermediate any air ingress portal such as an air hole and the air electrode to regulate atmospheric gas permeability and to prevent water from leaving the cell. Such a gas differentiation system can include a hydrophobic protective membrane, such as Teflon film, solid ionically conducting polymer material, other gas differentiating membranes such as Zitex® or the undoped material detailed in Example 1. Zeolites and other adsorption additives can also be included by their incorporation into a film or by being otherwise put into the gas differentiation system.

In an aspect, the air cathode can be used in a battery with a mixed cathode structure. This mixed structure uses the air cathode as described in combination with a typical alkaline cathode construction. For example, in the construction described in association with FIG. 3, there are shown three cathode rings 121-123. In this aspect at least one of the rings would not comprise the solid ionically conducting polymer material in order to provide a hybrid cathode which would include at least one ring having manganese dioxide, conductive carbon, KOH electrolyte, and other additives typical of alkaline battery cathodes, but no solid ionically conducting polymer material. In addition, at least one ring would comprise the solid ionically conducting polymer material and at least an electrically conducting material such as carbon. This ring comprising the solid ionically conducting polymer material could also further comprise manganese dioxide or another codepolarizer, a catalyst, and other mentioned additives. The construction of this aspect enables high drain rates because of the lower relative impedance of the ring without the solid ionically conducting polymer material.

However, the construction also enables the ring without the solid ionically conducting polymer material to be recharged because of its ability to conduct hydroxide ions via the aqueous electrolyte. Thus such a hybrid construction further demonstrates the utility of the solid ionically conducting polymer material and its ability to improve the performance of typical systems when used in such systems.

Thus the solid ionically conducting polymer can be included in an air electrode which has a desired shape, surface area, porosity, and gas differentiation properties.

Example 3

Ground poly(phenylene sulfide) polymer and lithium hydroxide monohydrate were added together in the proportion of 67% to 33% (by wt.), respectively, and mixed using jet milling. The resulting ion containing compound-polymer mix, manganese dioxide powder (EMD from Erachem) and C45 carbon black were added together in the proportion of 30%, 50% and 20%, respectively, and thoroughly mixed using a V-blender.

The V-blended mixture was placed into a heating container and heated to a desired heat-treatment temperature (305 to 345° C., or greater than 300° C., and between 250-450° C.) for a specified time (10-50 minutes). After cooling the resulting material was mixed with carbon. In an aspect the composition is 50% manganese dioxide, 20% Ketjenblack EC-600JD and 30% polymer/LiOH mix (by weight). In another aspect the carbon can comprise 10-30 wt % and manganese dioxide 40-70 wt %, with the balance the polymer, ionic compound and other additives.

The cathode resulting powder was re-grinded, mixed with 40% KOH solution at about 6 wt. to create an air cathode mix.

Example 4

Air cathode mix from Example 3 was loaded into a tool, comprising a cylindrically shaped outer tube, a center pin and end bushings. A desired amount of the cathode material powder is loaded into the tool with inserted bottom bushing and center pin. Then the top bushing is inserted and the tool is placed under the press. Hydraulic pressure is applied to drive end bushings to a pre-defined depth to form cathode sections shaped as hollow rings (FIG. 2a).

After bushings are extracted, the cathode section can be transferred into the can. Typically, three cathode sections are used to build a cell. After cathode sections are put in place, center pin is inserted again and pressure is applied to expand cathode sections locking them in place (FIG. 2b).

Traditional separator assembly, made of commercial nonwoven separator (NKK), was inserted into the cell. Then 0.6 cc of 40% KOH solution was added. Zn anode slurry, extracted from commercial alkaline cells, was added inside the separator. The nail and sealing assembly was inserted and locked by lightly compressing cell walls (FIG. 2c).

Air access holes were drilled in the cell can to provide air access.

Example 5

The AA cell construction including the air cathode and cell design and described in Example 4 are compared to a comparative commercial AA cell ("Coppertop®") in the below Table 6:

TABLE 6

|  | Example 4 (grams) | Coppertop (grams) |
| --- | --- | --- |
| Cathode: |  |  |
| EMD | 1.0 | 8.1 |
| Carbon | 0.4 | 0.63 |
| Binder |  | 0.05 |
| KOH | 0.17 | 0.17 |
| Polymer Electrolyte | 0.6 |  |
| Anode: |  |  |
| Zinc Slurry | 6.8 | 3.8 |

The air cathode energy density is relatively high and therefore it does not need to be as thick as the cathodes of typical alkaline batteries, and the reduced volume lowers the raw material requirements of the air cathode. The larger interior void provided by the thinner cathode allows for a larger anode for the metal air battery. The larger interface area between the anode and cathode also allows for higher mass transfer area between the electrodes which enables higher drain rates. The amount of zinc slurry can be almost doubled relative the commercial cell, and the corresponding zinc to EMD ratio is much greater than 1:1. In other words, the anode to cathode electrochemically active weight ratio is greater than one (1:1). The cathode codepolarizer EMD to Carbon weight ratio—is greater than 2:1, and the codepolarizer EMD to polymer electrolyte weight ratio is greater than 1:1.

Example 6

After checking open circuit voltage and impedance, assembled cells from Example 4 were placed into the cell holders and tested using a Maccor 4600A instrument.

Figure 4:
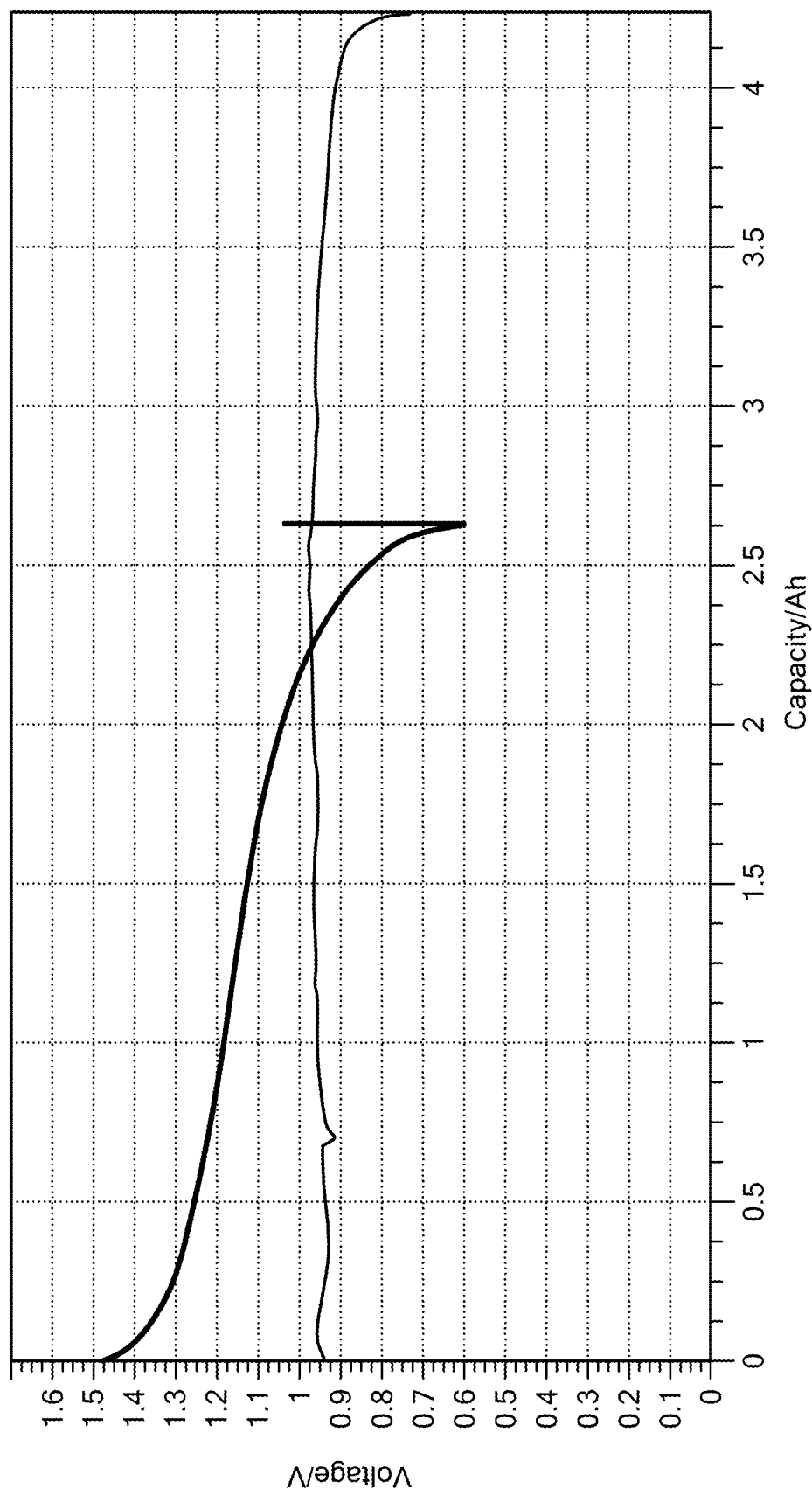
FIG. 4 is a discharge curve of a cell and comparative cells under continuous 150 mA discharge.

FIG. 4 shows a discharge curve of the AA cell created in Example 4 and comparative Duracell Coppertop® (black) under continuous 150 mA discharge. The cell delivered 4.2 Ah to a 0.8V voltage cut off. In comparison, commercial cell capacity under the same conditions was limited to about 2.6 Ah.

Example 7

After checking open circuit voltage and impedance, cells assembled in Example 4 were placed into the cell holders and tested using a Maccor 4600A instrument.

Each cell was subjected to intermittent discharge at 24 Ohm resistance load for 15 seconds, followed by 45-second rest. The test was continued until cell voltage dropped to 1.0V. This discharge protocol can be considered as an accelerated version of a standard remote control test, since standard test applies load only 8 hours per day.

Figure 5:
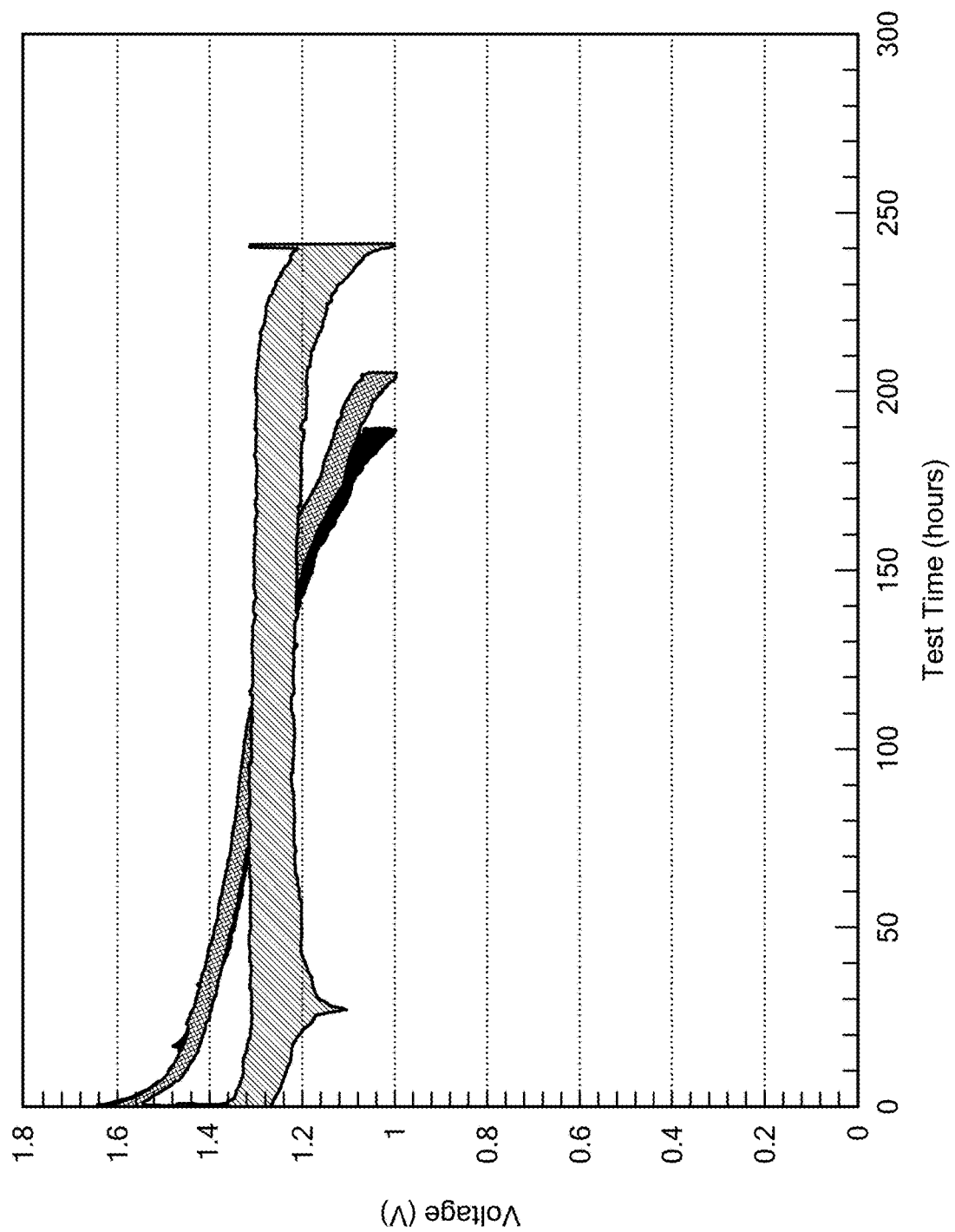
FIG. 5 is a discharge curve described in Example 7 showing intermittent discharge voltage of the Example 7 cell and comparative commercial cells as a function of test time.

Referring to FIG. 5, the cell from example 4 was compared against both a commercially sold Duracell Coppertop® and Energizer Max® cells. Under these discharge conditions, the cell of Example 4 outlasted commercial AA cells by more than 20%.

Example 8

After checking open circuit voltage and impedance, cells from Example 4 were placed into the cell holders and tested using Maccor 4600A instrument.

Cells were subjected to intermittent discharge at 3.9 Ohm resistance load for 1 hour, followed by 1-hour rest. Test was continued until cell voltage drops to 0.8V. The discharge protocol can be considered as an accelerated toy test as it is utilizing shorter rest period compared to standard toy test (1 hour vs. 23 hours).

Figure 6:
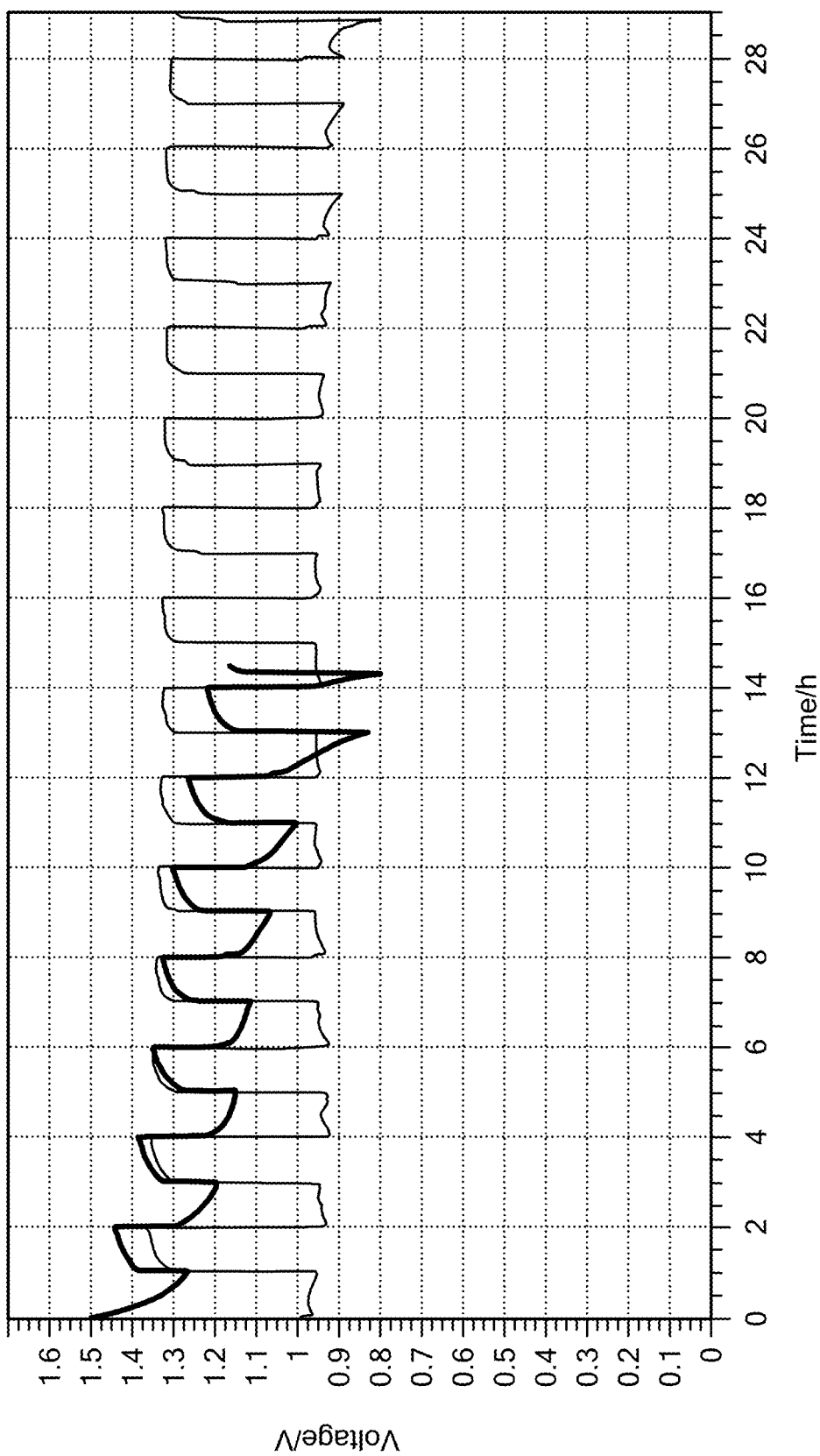
FIG. 6 is a discharge curve described in Example 8 showing intermittent discharge as a function of test time.

FIG. 6 shows the discharge as a function of time. Under these discharge conditions the cell of Example 4 outlasted commercial cells by almost 200%.

In addition the AA cell demonstrated greater than 3 Ah capacity during: Continuous constant current discharge at current between 150 and 300 mA with 0.8 V voltage cutoff; Intermittent discharge at current between 150 and 300 mA cutoff applied for 1 hour, followed by 1-hour rest period (0.8V voltage cutoff); Continuous constant current discharge at 50 mA to 1.0V voltage cutoff; Intermittent discharge at 50 mA with applied for 1 hour, followed by 1-hour rest period (1.0V voltage cutoff); Continuous constant resistance discharge at 3.9 Ohm to 0.8 voltage cutoff; Intermittent constant resistance discharge when 3.9 Ohm resistance is applied for 1 hour, followed by 1-hour rest period (0.8 voltage cutoff); Continuous constant resistance discharge of at 42 Ohm to 1.0V voltage cutoff; and Intermittent constant resistance discharge when 42 Ohm resistance is applied for 15 seconds, followed by 45-second rest period (1.0V voltage cutoff).

Example 9

To compare performance of cells made according to this application relative competing technologies, which typically are implemented in different form-factors, cell capacity and discharge rate were normalized per cell volume. Cells which were assembled in Example 4 and Duracell Coppertop alkaline cells were both discharged at constant current of 150 and 250 mA. Capacity delivered during discharge was divided by the volume of a standard AA cell to produce Ah/L. Discharge current was similarly normalized by cell volume to yield A/L.

Panasonic PR2330 coin cells were discharged at 10 and 15 mA constant current. Capacity and discharge rate were normalized per cell volume as described above. Performance parameters of Cegasa ALR40/100 cell, smallest cell of cylindrical design, were taken from datasheet and normalized to cell volume. Performance of air assisted Eveready D cell was calculated based on results disclosed in U.S. Pat. No. 5,079,106. Performance of air assisted Duracell AA cell was calculated based on results reported in U.S. Pat. Nos. 7,238,448 and 7,615,508. Discharge rate on intermittent discharge was converted to continuous discharge equivalent by averaging current draw over the reported duty cycle. For example, 600 mA load for 2 seconds, followed by 28-second rest, is equivalent to 40 mA continuous discharge (600*2/30=40). Data was normalized per cell volume as described above.

Figure 8:
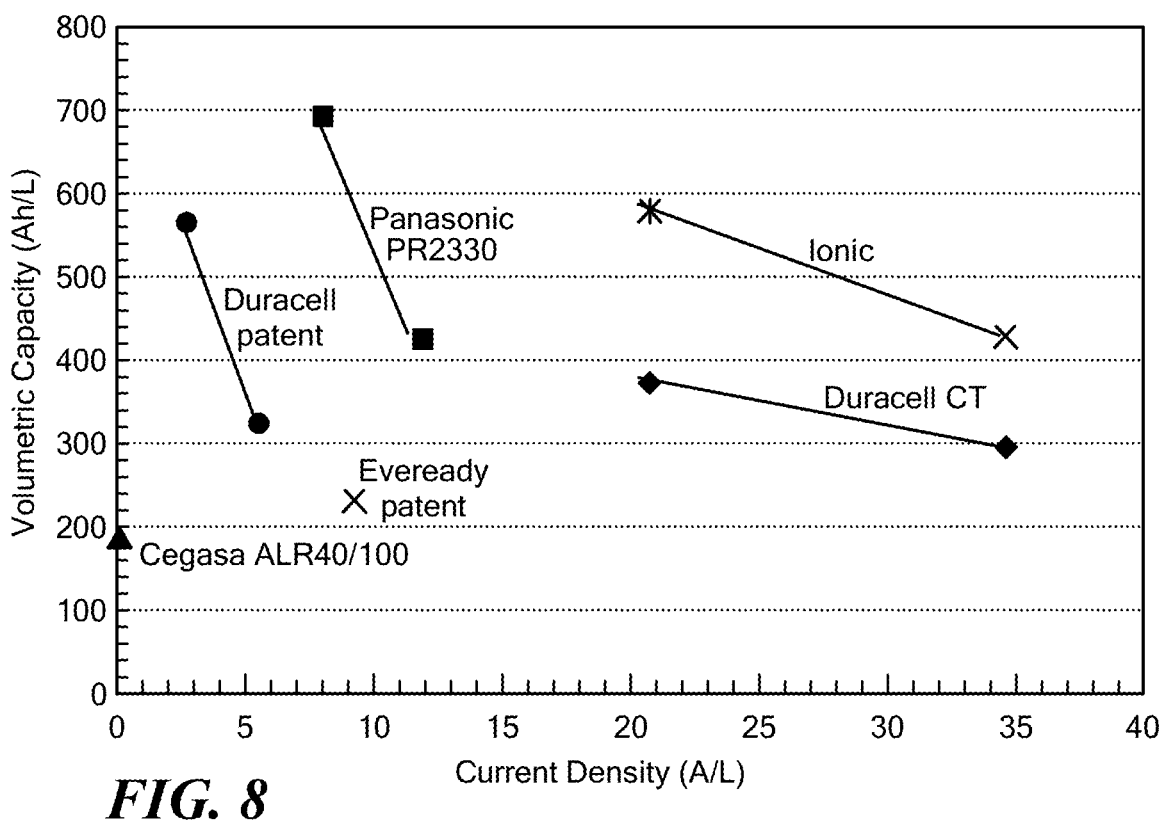
FIG. 8 is a cross-sectional representative view of an aspect of the invention showing a thin film battery.

Referring to FIG. 8 there is shown a comparison of volumetric capacity vs rate profiles for the above listed cells. The air assisted cells perform at discharge rates typical for alkaline cells, and demonstrate significantly greater cell capacity.

It is theorized that the solid ionically conducting polymer material improves the performance by participating in the electrochemical reaction (oxygen reduction), by facilitating oxygen reduction, and by improving hydrophobic properties of the cathode.

Thin Film Air Cathode

Figure 7:
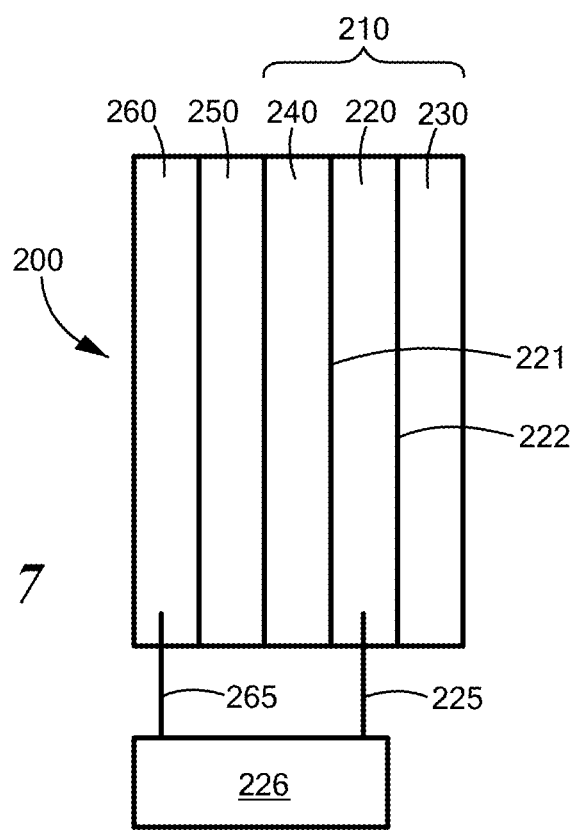
FIG. 7 is a volumetric normalized curve described in Example 9 showing a comparison of volumetric capacity rate per volume profiles for various technologies.

In an aspect of the invention, the described air cathode including the solid ionically conducting polymer material can take the form of a thin film structure. The solid ionically conducting polymer material enables the air cathode to comprise more than one film layer which can be incorporated into a structure such as a can, or operate as a flexible thin film battery operating with a flexible housing or without any container or housing. Referring to FIG. 7, there is shown a graphical representation of the thin film battery 200 of this aspect. Although this aspect is characterized as a thin film battery, it is not to be limited to the relative thickness of the battery components that will be described.

A cathode 210 is shown as comprising three component layers, an air electrode 220, having both a first surface 221 and second surface 222 which receives oxygen from the atmosphere or another oxygen source. The air cathode is electrically connected to a cathode collector 225 which contacts the air cathode to provide electrical conductivity from the air cathode 220 to a load 226. The air cathode comprises material and an electrically conductive material such as carbon, graphite or other materials typically used in cathodes as electrically conducting materials.

The air cathode can receive oxygen through its second surface 222 from a gas differentiation layer 230. The gas differentiation layer is optional and can be incorporated into the air cathode in an aspect of the invention. The gas differentiation layer can be useful and required in environments where the air electrode would benefit: from receiving larger partial concentrations of oxygen than are available the battery, such as from air; when the battery would benefit from lower concentrations of water and carbon dioxide than are otherwise available the battery; and when the battery would benefit from a barrier to water loss flowing from the air electrode. Differential transport of oxygen, water and carbon dioxide can be engineered into the gas differentiation layer by the inclusion of materials that enable such differential transport and which can be included into the gas differentiation layer. Such materials include: hydrophobic materials such as a Teflon, liquid crystal polymer ("LCP") or other known water barriers, carbon dioxide adsorption zeolites with engineered or naturally occurring adsorption sites. Such materials can be mixed with the solid ionically conducting polymer material or other membrane to create a gas differentiation system that enables oxygen to enter the cell and reach the air electrode at a rate necessary to enable the desired electrochemical drain rates, while selectively retarding and preventing carbon dioxide and water permeability.

Under load, and with oxygen being transported to the air electrode 220, the air electrode acts to electrochemically reduce the oxygen to hydroxide ions, which are ionically conducted along with oxygen from the air electrode via its component solid ionically conducting polymer material to the first surface 221. The first surface can ionically communicate with an optional codepolarizer containing air cathode second portion 240. The air cathode second portion comprises the solid ionically conducting polymer material, an electrically conductive material such as carbon, and a codepolarizer such as EMD or other suitable cathode depolarizer. In an aspect, the cathode second portion can include potassium hydroxide solution and act to transport it to the first surface 221 and throughout the cathode 210 in an aqueous metal-air cell. The EMD or other codepolarizer electrochemically reacts and in its reduced form, can be reoxidized by the peroxide ions and oxygen transported to the cathode second portion or combination air cathode. Although this layer or second portion is described as a separate film, in an aspect, it can also be incorporated into the air cathode or substituted therefore. This layer is also ionically conductive as it comprises the solid ionically conducting polymer material, and is electrically conductive because of the carbon or other suitable electrical conductive material, and acts to ionically conduct hydroxide ions to the anode across a separator layer 250.

The separator layer 250 is comprised of the solid ionically conducting polymer material and is not electrically conductive as it acts as a dielectric barrier between the cathode 210 and an anode 260. This separator layer can be a distinct layer or incorporated into the anode 260. Thus, separator layer 250 is ionically conducting, dielectric and non-electrochemically active and interposed between the air electrode 250 of the cathode 210 or the second portion 240 when it is included. In an aqueous battery, the separator layer also actos as a fluid transport layer between the anode and cathode. The separator layer is interposed between the anode and cathode and adjacent the cathode whether it comprises the air cathode and/or the second cathode layer.

The anode 260 includes an anode current collector 265 and is either physically connected to it, such as if the anode is a metal foil or structure, or electrically connected to it if the anode comprises an electrochemically active material disposed in a material such as a gel. In an aspect the anode 260 can include solid ionically conducting polymer material, and if it does so, the separator layer 250 is not required in that the solid ionically conducting polymer material can act to electrically insulate the electrochemically active material and any electrically conductive material from the cathode 210. If the electrochemically active material is enclosed by the solid ionically conducting polymer material, then the anode may not require any additional environmental protection. However, such protection can be provided by including the anode and the battery in a pouch, can, housing or other typical battery enclosure.

This described aspect of the invention provides flexibility in design and enables a high energy density flexible battery. The battery 200 and its components can be scaled for the application and enclosed or unenclosed. As the solid ionically conducting polymer material is a thermoplastic, the described components of the battery 200 can be heat sealed, coextruded or otherwise integrated into a single coherent film.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein. It is to be understood that variations and modifications can be made on the aforementioned structure without departing from the concepts of the describe aspects, and further it is to be understood that such concepts are intended to be covered by the following claims unless these claims by their language expressly state otherwise.

What is claimed is:

1. A metal-air battery comprising:
an air electrode that includes: an electrically conductive material, and a solid ionically conducting polymer material;
wherein the air electrode acts to produce an hydroxide ion when the air electrode is exposed to an oxygen gas source and when the battery is under load;
wherein the solid ionically conducting polymer material ionically conducts the hydroxide ion;
wherein the solid ionically conducting polymer material is ionically conductive through the solid and not through any solvent, gel or liquid phase;
wherein the solid ionically conducting polymer material has an ionic conductivity greater than $1\times10^{-5}$ S/cm at room temperature;
wherein the solid ionically conducting polymer material has an electronic conductivity of less than $1\times10^{-5}$ S/cm at room temperature; and
wherein the solid ionically conducting polymer material has a glassy state, and wherein the solid ionically conducting polymer material conducts the hydroxide ion in the glassy state.

2. The battery of claim 1, further comprising a negative electrode including a first electrochemically active metal; and an ionically conducting, dielectric material interposed between the air electrode and the negative electrode and in contact with the air electrode.

3. The battery of claim 1, wherein the solid ionically conducting polymer material comprises a cationic diffusing ion, wherein the diffusivity of the cationic diffusing ion is greater than $1.0\times10^{-12}$ m$^2$/S at room temperature.

4. The battery of claim 1, wherein the solid ionically conducting polymer material comprises an anionic diffusing ion comprising the hydroxide ion, wherein the diffusivity of the anionic diffusing ion is greater than $1.0\times10^{-12}$ m$^2$/S at room temperature.

5. The battery of claim 1, wherein the solid ionically conducting polymer material comprises both an anionic diffusing ion comprising the hydroxide ion and a cationic diffusing ion, wherein each at least one cationic and anionic diffusing ion have a diffusivity, wherein the anionic diffusivity is greater than the cationic diffusivity at room temperature.

6. The battery of claim 1, wherein the cationic transference number of the solid ionically conducting polymer material is greater than 0.5 and less than 1.0 at room temperature.

7. The battery of claim 1, wherein the solid ionically conducting polymer material comprises lithium.

8. The battery of claim 7, wherein the concentration of lithium is greater than 3 moles of lithium per liter of solid ionically conducting polymer material.

9. The battery of claim 1, wherein the solid ionically conducting polymer material has an ionic conductivity greater than $1\times10^{-4}$ S/cm at room temperature.

10. The battery of claim 1, wherein the solid ionically conducting polymer material has an ionic conductivity greater than $1\times10^{-3}$ S/cm at 80° C.

11. The battery of claim 1, wherein the solid ionically conducting polymer material has an ionic conductivity greater than $1\times10^{-5}$ S/cm at 40° C.

12. The battery of claim 1, wherein the solid ionically conducting polymer material comprises both an anionic diffusing comprising the hydroxide ion and a cationic diffusing ion, wherein the cationic diffusing ion comprises lithium, and wherein the diffusivity of lithium ion and the hydroxide ion are both greater than $1.0\times10^{-13}$ m$^2$/s at room temperature.

13. The battery of claim 1, wherein the solid ionically conducting polymer material exhibits UL 94 V-0 flame retardancy.

14. The battery of claim 1, wherein the solid ionically conducting polymer material is formed from the reaction product of a base polymer, electron acceptor and an ionic compound.

15. The battery of claim 14, wherein the base polymer is polyphenylene sulfide (PPS) or a liquid crystal polymer.

16. The battery of claim 1, wherein the air electrode further comprises a metal oxide.

17. The battery of claim 16, wherein the metal oxide is manganese dioxide.

18. The battery of claim 1 wherein the air electrode further comprises manganese dioxide, and the manganese dioxide is selected from a group comprising β-MnO2 (pyrolusite), ramsdellite, γ-MnO2, ε-MnO2, λ-MnO2, EMD, CMD, and combinations thereof.

19. The battery of claim 2, wherein the first electrochemically active metal comprises zinc, aluminum, calcium, magnesium, potassium, sodium or lithium.

* * * * *